US008862744B2

(12) United States Patent
Garg et al.

(10) Patent No.: US 8,862,744 B2
(45) Date of Patent: Oct. 14, 2014

(54) OPTIMIZING TRAFFIC LOAD IN A COMMUNICATIONS NETWORK

(75) Inventors: Vipin Garg, Santa Clara, CA (US);
David Ian Allan, San Jose, CA (US)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 253 days.

(21) Appl. No.: 13/396,309

(22) Filed: Feb. 14, 2012

(65) Prior Publication Data

US 2013/0212578 A1     Aug. 15, 2013

(51) Int. Cl.
| | |
|---|---|
| *G06F 9/455* | (2006.01) |
| *G06F 15/16* | (2006.01) |
| *H04L 12/26* | (2006.01) |
| *H04N 21/443* | (2011.01) |
| *G06F 9/48* | (2006.01) |

(52) U.S. Cl.
CPC ............... *G06F 9/455* (2013.01); *G06F 15/16* (2013.01); *H04L 12/26* (2013.01); *H04N 21/4437* (2013.01); *G06F 9/4856* (2013.01)
USPC ............... 709/226; 718/1; 370/236; 709/203

(58) Field of Classification Search
CPC ... G06F 9/4856; H04N 21/4437; H04L 12/26
USPC .......................... 709/226, 203; 370/236; 718/1
See application file for complete search history.

(56) References Cited

U.S. PATENT DOCUMENTS

| | | | | |
|---|---|---|---|---|
| 6,795,399 | B1 * | 9/2004 | Benmohamed et al. ...... | 370/235 |
| 7,424,710 | B1 * | 9/2008 | Nelson et al. ................. | 718/1 |
| 7,917,617 | B1 * | 3/2011 | Ponnapur et al. ............ | 709/224 |
| 8,266,275 | B2 * | 9/2012 | Xu et al. ....................... | 709/224 |
| 8,365,184 | B2 * | 1/2013 | Carter ............................ | 718/105 |
| 8,413,148 | B2 * | 4/2013 | Toeroe ............................. | 718/1 |
| 8,613,085 | B2 * | 12/2013 | Diab et al. ....................... | 726/22 |
| 2001/0003843 | A1 * | 6/2001 | Scepanovic et al. ............. | 716/7 |
| 2005/0198303 | A1 * | 9/2005 | Knauerhase et al. ......... | 709/227 |
| 2008/0002587 | A1 * | 1/2008 | Liu et al. ...................... | 370/238 |
| 2008/0295096 | A1 * | 11/2008 | Beaty et al. ....................... | 718/1 |
| 2009/0022070 | A1 * | 1/2009 | Iovanna et al. ............... | 370/256 |
| 2009/0119396 | A1 * | 5/2009 | Kanda ............................ | 709/223 |
| 2009/0216910 | A1 * | 8/2009 | Duchesneau ................ | 709/250 |
| 2009/0222558 | A1 * | 9/2009 | Xu et al. ....................... | 709/224 |

(Continued)

OTHER PUBLICATIONS

Awadallah et al., "The vMatrix: A Network of Virtual Machine Monitors for Dynamic Content Distribution", 2002.*

(Continued)

*Primary Examiner* — O. C. Vostal

(57) ABSTRACT

A system and method that facilitates the migration of one or more Virtual Machines (VMs) throughout a communications network, such as a cloud network, is disclosed. A management system monitors a current traffic matrix to determine if the network is congested. If the network is congested, the management system determines a minimum number of VMs that must be migrated to unused VM sites to ease the congestion and optimize the distribution of traffic in the network. Additionally, the management system also identifies which VMs should be migrated to which unused VM sites, and a sequence in which the migration should be performed to return the bandwidth distribution in the network to an acceptable level. In addition, the management system may determine which unused VM site or sites is best for the addition of one or more new VMs or groups of VMs.

56 Claims, 16 Drawing Sheets

(56) References Cited

U.S. PATENT DOCUMENTS

| | | | |
|---|---|---|---|
| 2009/0228589 A1* | 9/2009 | Korupolu | 709/226 |
| 2009/0276765 A1* | 11/2009 | Das et al. | 717/154 |
| 2010/0027420 A1* | 2/2010 | Smith | 370/235 |
| 2010/0054129 A1* | 3/2010 | Kuik et al. | 370/235 |
| 2010/0290397 A1* | 11/2010 | Narayana et al. | 370/328 |
| 2010/0306408 A1* | 12/2010 | Greenberg et al. | 709/238 |
| 2011/0131569 A1* | 6/2011 | Heim | 718/1 |
| 2011/0161957 A1* | 6/2011 | Bernardi et al. | 718/1 |
| 2011/0167421 A1* | 7/2011 | Soundararajan et al. | 718/1 |
| 2011/0185064 A1* | 7/2011 | Head et al. | 709/226 |
| 2011/0216648 A1* | 9/2011 | Mehrotra et al. | 370/230 |
| 2011/0246669 A1* | 10/2011 | Kanada et al. | 709/238 |
| 2011/0282986 A1* | 11/2011 | Phaal | 709/226 |
| 2011/0296052 A1* | 12/2011 | Guo et al. | 709/240 |
| 2011/0302068 A1* | 12/2011 | Garrett et al. | 705/34 |
| 2011/0302578 A1* | 12/2011 | Isci et al. | 718/1 |
| 2012/0011254 A1* | 1/2012 | Jamjoom et al. | 709/226 |
| 2012/0036515 A1* | 2/2012 | Heim | 718/105 |
| 2012/0084445 A1* | 4/2012 | Brock et al. | 709/226 |
| 2012/0099602 A1* | 4/2012 | Nagapudi et al. | 370/401 |
| 2012/0102190 A1* | 4/2012 | Durham et al. | 709/224 |
| 2012/0127857 A1* | 5/2012 | Sundar et al. | 370/230.1 |
| 2012/0266163 A1* | 10/2012 | Durham et al. | 718/1 |
| 2013/0073731 A1* | 3/2013 | Bose et al. | 709/226 |
| 2013/0100816 A1* | 4/2013 | Bergamasco et al. | 370/237 |
| 2013/0182574 A1* | 7/2013 | SO et al. | 370/236 |

OTHER PUBLICATIONS

Hu et al., "A Time-Series Based Precopy Approach for Live Migration of Virtual Machines", 2011.*
Piao et al., "A Network-aware Virtual Machine Placement and Migration Approach in Cloud Computing", 2010.*
Chen et al., "A Cloud Computing Resource Scheduling Policy Based on Genetic Algorithm with Multiple Fitness", 2012.*
Pappas et al., "Self-organizing systems based on morphogenesis principles", 2011.*
Van et al., "Autonomic virtual resource management for service hosting platforms", 2009.*
Novakovic, "Maximizing Performance and Minimizing Costs in Cloud Services", 2009.*
Xu et al., "Multi-objective Virtual Machine Placement in Virtualized Data Center Environments", 2010.*
Dupont et al., "FIT4Green Federated IT for a sustainable environment impact", 2012.*
Popa et al., "Resilience and Survivability for future networking: framework, mechanisms, and experimental evaluation", 2011.*
Mann et al., "Remedy: Network-Aware Steady State VM Management for Data Centers", 2012.*
Karimi et al., "Are Clouds Ready for Geoprocessing ?", 2012.*
Shieh et al., "Sharing the Data Center Network", 2011.*
Tang et al., "A Scalable Application Placement Controller for Enterprise Data Centers", 2007.*
Clark et al., "Live Migration of Virtual Machines", 2005.*
Agrawal et al., "Grouping Genertic Algorithm for Solving the Server Consolidation Problem with Conflicts", 2009.*
Bose et al., "Optimizing Migration of Virtual Machines across Data-Centers", 2009.*
The extended European Search Report dated May 23, 2013 for the counterpart European Patent Application No. 13155050.1, pp. 1-10.
Xiaoqiao Meng et al. "Improving the Scalability of Data Center Networks with Traffic-aware Virtual Machine Placement", INFOCOM, 2010 Proceedings IEEE, Mar. 14-19, 2010, pp. 1-9.

* cited by examiner

US 8,862,744 B2

OPTIMIZING TRAFFIC LOAD IN A COMMUNICATIONS NETWORK

FIELD OF THE INVENTION

The present invention relates generally to communication networks, and more particularly to systems and methods for easing congestion and optimizing the traffic load of a communications network.

BACKGROUND

Network links that carry traffic through a network between Virtual Machines (VMs) can, at times, become underutilized. Although link underutilization may be caused by various factors, it typically stems from a mismatch between the layout of the physical network and a traffic load that a network offers to support. To address underutilization, data center operators typically engineer a traffic matrix to better use underutilized links; however, engineering traffic through the network according to conventional wisdom generally requires changing the network topology. This is a consequence of the fact that in most networks the sources of load are geographically "pinned." Therefore the network needs to be responsive to mismatches in load.

For example, Multiprotocol Label Switching (MPLS) is a commonly deployed, but complex technology, by which networks use short labels instead of long network addresses to direct data between nodes. MPLS permits reactive traffic engineering via the creation of virtual links (which artificially drive up the mesh density in the network), and advertising such links into the routing system. This permits the portion of a traffic matrix to be directed around an over utilized link by placing the new virtual link such that the traffic traverses less utilized links.

Many conventional mechanisms for managing the utilization of the network links can complicate the network. Particularly, a network must be engineered such that it supports normal routing behavior, but also to allow a data center operator to override the normal routing behavior when necessary to optimize the network.

With the evolution of cloud computing, data center operators can manipulate the traffic matrix simply by re-arranging the source or sources of one or more loads. Additionally, it is possible that other classes of networks may emerge in the future having a similar capability. This is a consequence of virtualization and the instantiation of software in the VMs. Particularly, one or more VMs can run simultaneously in a computing core in a server, which is often hosted in a datacenter containing a large array of servers connected by a network. This virtualization of computing provides a unique opportunity to remove complexity from the network in that the sources of load in the datacenter are not geographically pinned. Further, the datacenter operator can re-arrange the load sources such that the offered load matches the physical network interconnecting the server array Such re-arrangement of the load source negates the need to alter the network topology, and allows the data center operators to exploit a single, simplified network fabric.

More particularly, data center operators can optimize a network by migrating a VM that, given its location is currently communicating with its peers over one or more congested links, to another VM location in which the communication with its peers would be over one or more underutilized links. To accomplish their goal, the data center operators must first connect the two VM sites together. Once connected, the code and data that constitute the VM "image" is migrated to the replacement VM. This usually requires an iterative process of copying the image of the VM being replaced in "pages" to the replacement VM. However, copying pages of information between VMs can be complicated and time consuming.

Specifically, the VM being replaced must remain "in-service" while the pages of its memory are copied and transferred to the replacement VM. Thus, even while the transfer occurs, the "in-service" VM is typically receiving generating, and storing new data. To ensure that all the data and code are migrated, a function is needed to determine which code and data has yet to be transferred, and which data and code has been changed or altered since being transferred (i.e., "dirty" pages). Once all the pages are written to the replacement VM, the process begins another iteration to copy the "dirty" pages to the replacement VM. This iterative process continues until both VMs are exact copies of one another, or until the data center operator decides that the replacement VM is "close enough."

Alternative procedures such as "spawn and destroy" exist where a new VM being added to a compute pool is configured with characteristics that are identical to an old VM it is replacing. Once the old VM has completed its tasks, it is administratively taken offline and destroyed. This "spawn and destroy" method can be considered to be a variation of VM migration, albeit with a different set of operational issues.

Indeed, the methods currently used to re-arrange the load sources in a network are not without problems. Aside from the issues noted above, conventional methods require knowing where in the network to place the VMs before a service that will use the VMs is instantiated. Placing the VMs in the network in an intelligent or planned manner can be fairly straightforward; however, as seen above, the migration of the traffic communicated by live VMs is not. Specifically, using conventional methods, the migration of a VM (i.e., moving the traffic from one VM to another) can take a very long time. And, even though techniques exist to minimize any actual service outage, the length of time needed for a migration dictates that the migration of a VM is not a procedure to be taken lightly. Further, designing the network to handle normal routing behavior and to override the normal routing behavior, increases costs. Additionally, the amount of signaling needed by the network to analyze problems increases proportionally with the amount of manipulation of the traffic matrix needed to override normal routing behavior.

Conventional methods of engineering a traffic matrix and migrating VM traffic could be improved upon given a method and apparatus configured to determine and identify the minimum number of VMs that must be migrated to correct or fix network problems and optimize the network.

SUMMARY

The present invention provides a system and method that facilitates the traffic engineering of a communications network (e.g., a cloud network) via migration of one or more Virtual Machines (VMs) to redistribute load. In one embodiment, a modeling function executing on a management system monitors a current traffic matrix to determine whether one or more links connecting the VMs is congested. If one or more links in the network is congested, the present invention will provide information to a data center operator that will allow the operator to optimize moving the traffic associated with one or more impacted VMs to utilize links that are not congested.

More particularly, in one exemplary embodiment, the management system obtains information regarding the network topology, the traffic matrix, and the various resource needs of the VMs. Based on this information, the management system executes the modeling function to determine a minimum number of VMs, if any, that must be migrated to other unused locations in the network to ease the congestion and optimize the network. Note that for the purposes of this disclosure, an unused location or site simply refers to a location that has the capacity to support the VM instance of interest. As stated previously, multiple VMs can share a computing core.

Additionally, in one embodiment, the modeling function identifies which particular VMs should be migrated to which particular unused locations, and identifies a preferred sequence in which the VM migration should be performed. Although the actual sequence in which the VMs are migrated does not matter, moving the VMs in the preferred sequence may relieve congestion faster than if the VMs were migrated according to another order. Using this information, the data center operator can migrate only the minimum set of specific VMs needed to return distribution of traffic throughout the network to an acceptable level.

In another embodiment, the modeling function at the management system is configured to determine the most appropriate unused location in the network for a new VM being added to expand the compute capacity of an existing customer service instance. To find a location, the modeling function evaluates all possible unused locations to determine the possible traffic matrix that could result if a new VM were placed at that location. Based on an analysis of the location as if the new VM were instantiated at the location, the modeling function will indicate to the data center operator whether the location under analysis is the best possible location for the new VM. Armed with this information, the data center operator can add the new VM to the network.

In yet another embodiment, the modeling function at the management system is configured to determine the most appropriate set of unused locations for a group of new VMs to be added to the network. In this embodiment, the modeling function initially evaluates pairs of VMs as if they were added to the network at corresponding pairs of unused locations. More particularly, the modeling function first determines a pair of appropriate locations for the VM pair in the set to be added that has the most demanding bandwidth requirement. Once locations for this pair have been found, the modeling function determines the most appropriate unused locations for the remaining VMs to be added.

Of course, those skilled in the art will appreciate that the present invention is not limited to the above contexts or examples, and will recognize additional features and advantages upon reading the following detailed description and upon viewing the accompanying drawings.

DETAILED DESCRIPTION

The present invention provides a system and method that facilitates the engineering and maintenance of a data center network or switching fabric via Virtual Machines (VMs) placement. In one embodiment, the present invention monitors the current traffic matrix to determine if the network is becoming, or has become, congested. If one or more links in the network is congested, the present invention determines, based on information regarding the network topology, the traffic matrix, and the various resource needs, a minimum number of VMs, if any, that must be migrated to other unused VM locations or sites to ease the congestion and optimize the network. Additionally, the present invention identifies which particular VMs should be migrated to which particular unused VM sites, as well as the sequence in which the migration should be performed. Armed with this information, a data center operator can perform the migration so that the distribution of bandwidth utilized throughout the network returns to an acceptable level.

As used herein, "congested" means that one or more of the links over which the VMs communicate traffic have a measured bandwidth utilization that equals or exceeds a predetermined utilization threshold implying increased latency, reduced burst tolerance, and possibly packet loss. Where a single link (also known in the art as a "hop") is part of a path that connects source and destination VMs, the predetermined utilization threshold may be expressed as a percentage of bandwidth utilization (e.g., 80% of capacity, which would allow for burst tolerance). In a network having an acceptable level of bandwidth utilization, none of the links or paths (or as few as possible) would have a bandwidth utilization that equals or exceeds the predetermined thresholds.

Figure 1:
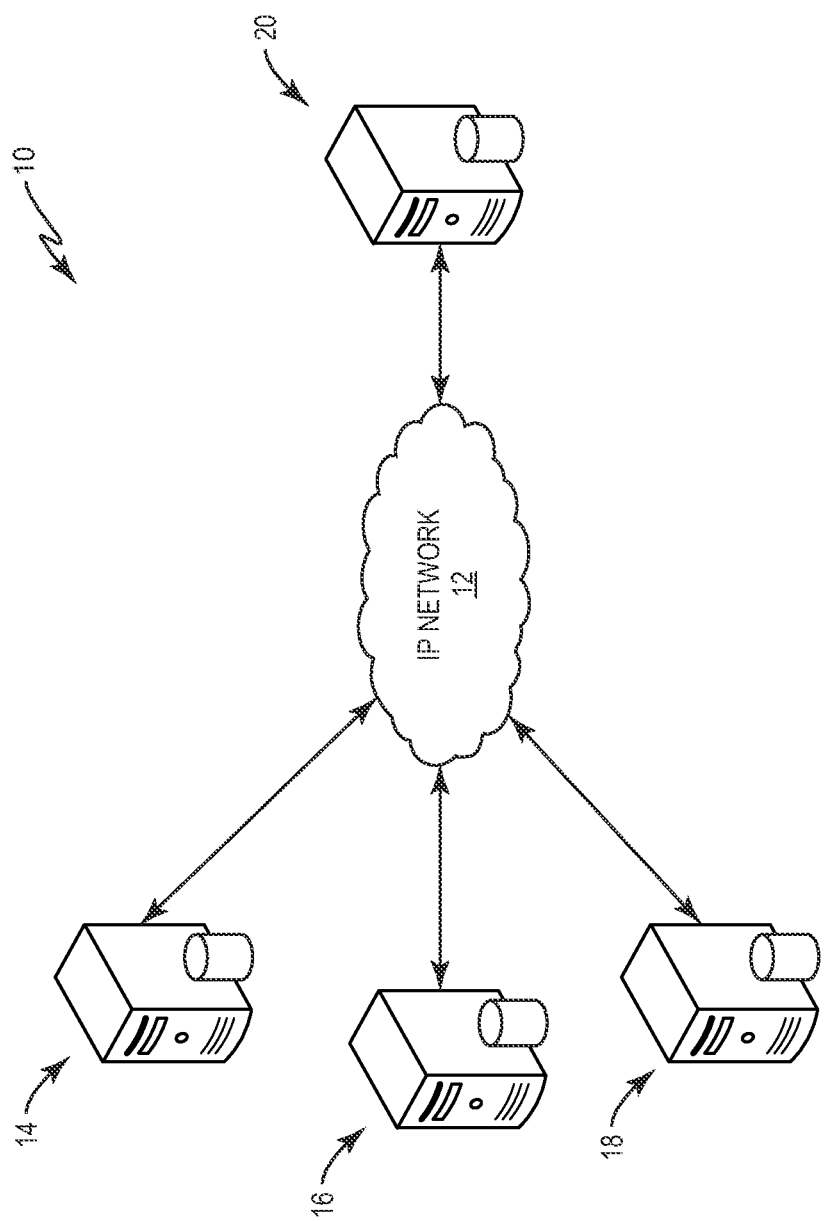
FIG. 1 is a block diagram illustrating components of a communications network configured according to one embodiment of the present invention.

Turning now to the drawings, FIG. 1 is a block diagram illustrating a communications network configured according to one embodiment of the present invention. As seen in FIG. 1, system 10 comprises a network 12 and a plurality of network elements. These include, but are not limited to, a plurality of network servers 14, 16, 18, and a management system 20.

The network 12 may be, for example, an IP network, such as the Internet and/or a private network that communicatively connects each of the servers 14, 16, 18, and the management system 20. Using the fabric of network 12, the servers 14, 16, 18, and the management system 20 communicate information using well known protocols and signaling. Generally, the servers 14, 16, 18 may store data in memory and provide that data to a user (not shown) connected to the network 12 responsive to receiving a request from the user. In one embodiment, the network 12 and its various network elements, such as servers 14, 16, 18 are part of a cloud network.

Therefore, the user need not know which exact server 14, 16, 18 stores and provides the requested data.

The servers 14, 16, 18 are network elements having one or more VMs that handle one or more services. As known in the art, virtual machines are software implementations of a machine. Particularly, each VM comprises a software program that, when executed by servers 14, 16, 18, functions as if it were a physical device, such as a router. VMs are able to access the hardware associated with the server 14, 16, 18, such as the memory and communication interfaces, to send and receive data to and from other peer VMs in the network.

The management system 20 is a network element that controls the operation of the VMs resident at the servers 14, 16, 18. As described in more detail later, the management system 20 comprises a modeling function. Based on measurements reflecting the amount of congestion in the network, the modeling function recursively simulates the migration of selected VMs to one or more unused VM sites. The result of the recursion identifies the minimum number of VMs that must be migrated in order to alleviate the detected congestion. Additionally, the modeling function also identifies which particular VMs to migrate to which particular unused VM sites, and stipulates a sequence in which to perform the VM migrations. The modeling function outputs this information to the data center operator via a display, for example, who can then effect the migrations on the identified VMs in the identified sequence.

Figure 2:
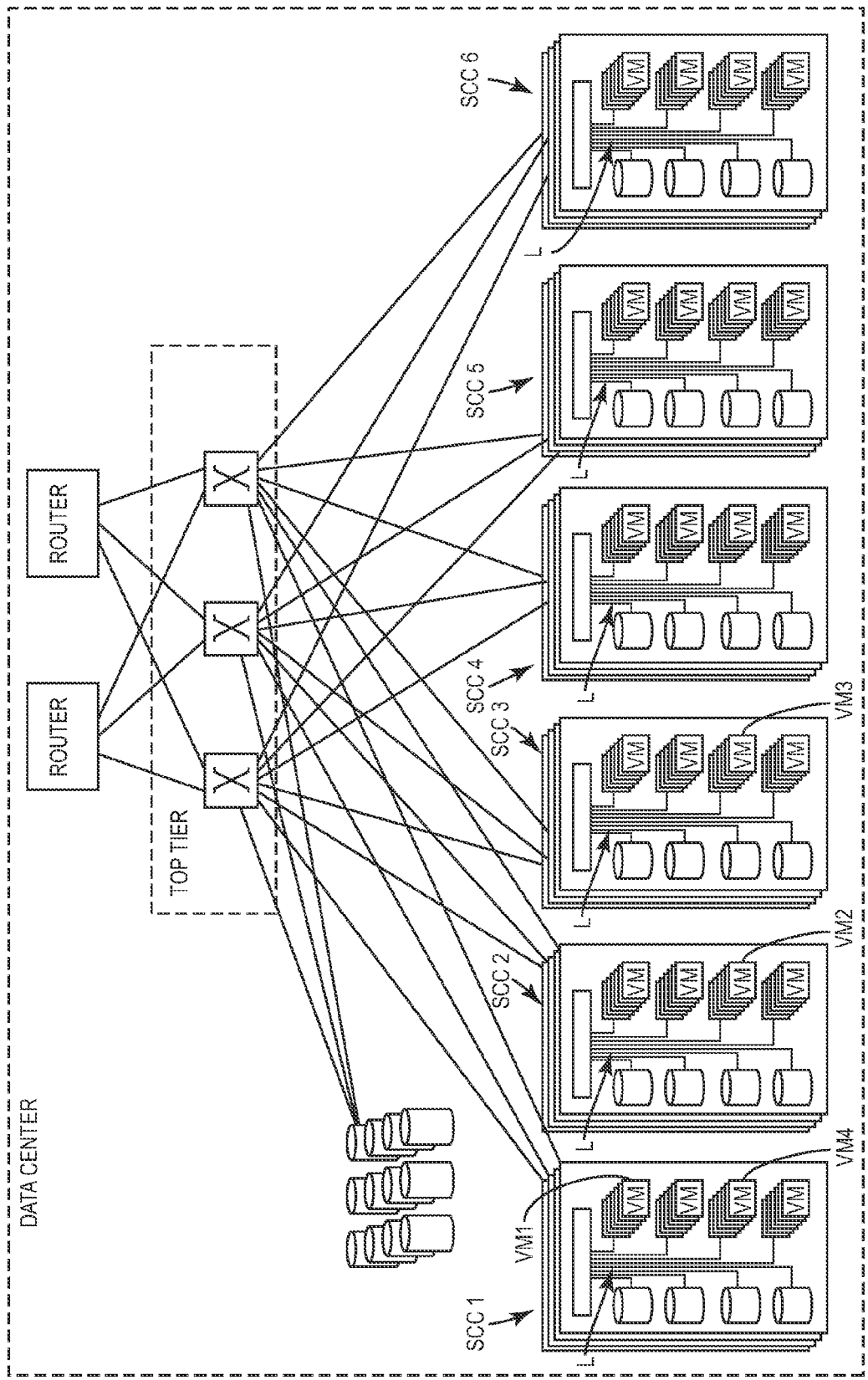
FIG. 2 is a block diagram illustrating the topology of a plurality of Virtual Machine (VMs) according to one embodiment of the present invention.

FIG. 2 is a block diagram illustrating a topology of a plurality of VMs that may be resident on one or more of the servers 14, 16, 18 according to one embodiment of the present invention. As seen in FIG. 2, a data center has a plurality of Server Compute Cores (SCCs). Each SCC communicatively connects to one or more Top Tier Switching Nodes (SNs), which in turn, are communicatively connected to multiple routers. Each SCC (SCC1-SCC6) includes a plurality of "in-service" virtual machines operating to provide corresponding services to users. There may be as many VMs and SCCs associated with the data center as needed or desired; however, each of the VMs is interconnected via communications paths comprising one or more constituent links L. As stated previously, data and signaling between the VMs occurs over these links, and a given communications path may be comprised of a single link, or may be comprised of multiple links.

Each link L has an associated predetermined available bandwidth. Thus, some links may be able to carry more traffic than others. In one embodiment of the present invention, the management system 20 monitors these links to determine whether the traffic traversing the links equals or exceeds a predefined bandwidth utilization threshold. By way of example, the data center operator may set the predefined threshold value for each link at 80%. Although any threshold value needed or desired may be defined, the 80% value could allow for a burst tolerance in which a given burst temporarily causes the bandwidth utilization to rise above the 80% value.

The management system 20 periodically measures the bandwidth utilization of each link using any means known in the art. If the management system 20 detects that the bandwidth utilization for any single link is above the predefined bandwidth utilization threshold value, the management system 20 may determine that the particular link is congested.

Regardless of the specific threshold values, or means of identifying congested links, the present invention configures the management system 20 to recognize such congestion and understand the placement of the traffic matrix of sets of VMs in the network so that it is able to determine whether the traffic handled by one or more of the "in-service" VMs may be migrated to an unused VM site or location to ease the congestion and cause the network to return to an acceptable utilization of the available bandwidth. FIG. 2 illustrates one such unused VM location or site as VM3. This site, although unused, has the physical hardware and circuitry required for a VM to operate, as well as the ability to communicate with all other VM sites (e.g., to VM1 and VM2). As seen in more detail below, and without changing the topology of the network, the present invention may take the traffic from one of the VMs (e.g., VM1 and VM2) determined to be communicating over at least one congested link, and migrate the traffic handled by that VM to VM3. Once migrated, VM3 would effectively perform as the other VM, but in a manner that does not cause network congestion.

Figure 3A:
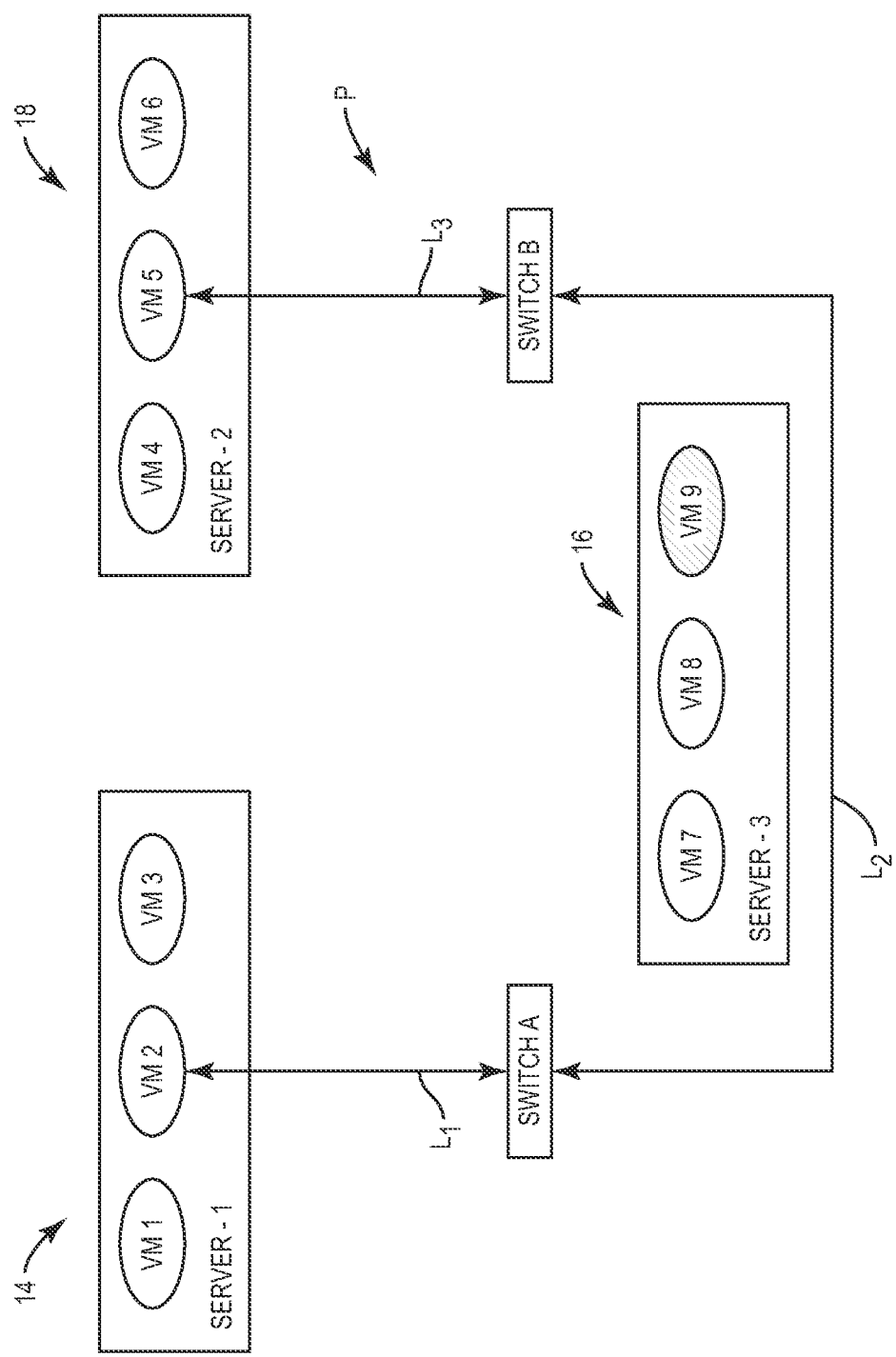
FIGS. 3A and 3B are block diagrams illustrating an exemplary migration of a VM from one server to another server according to one embodiment of the present invention.
Figure 3B:
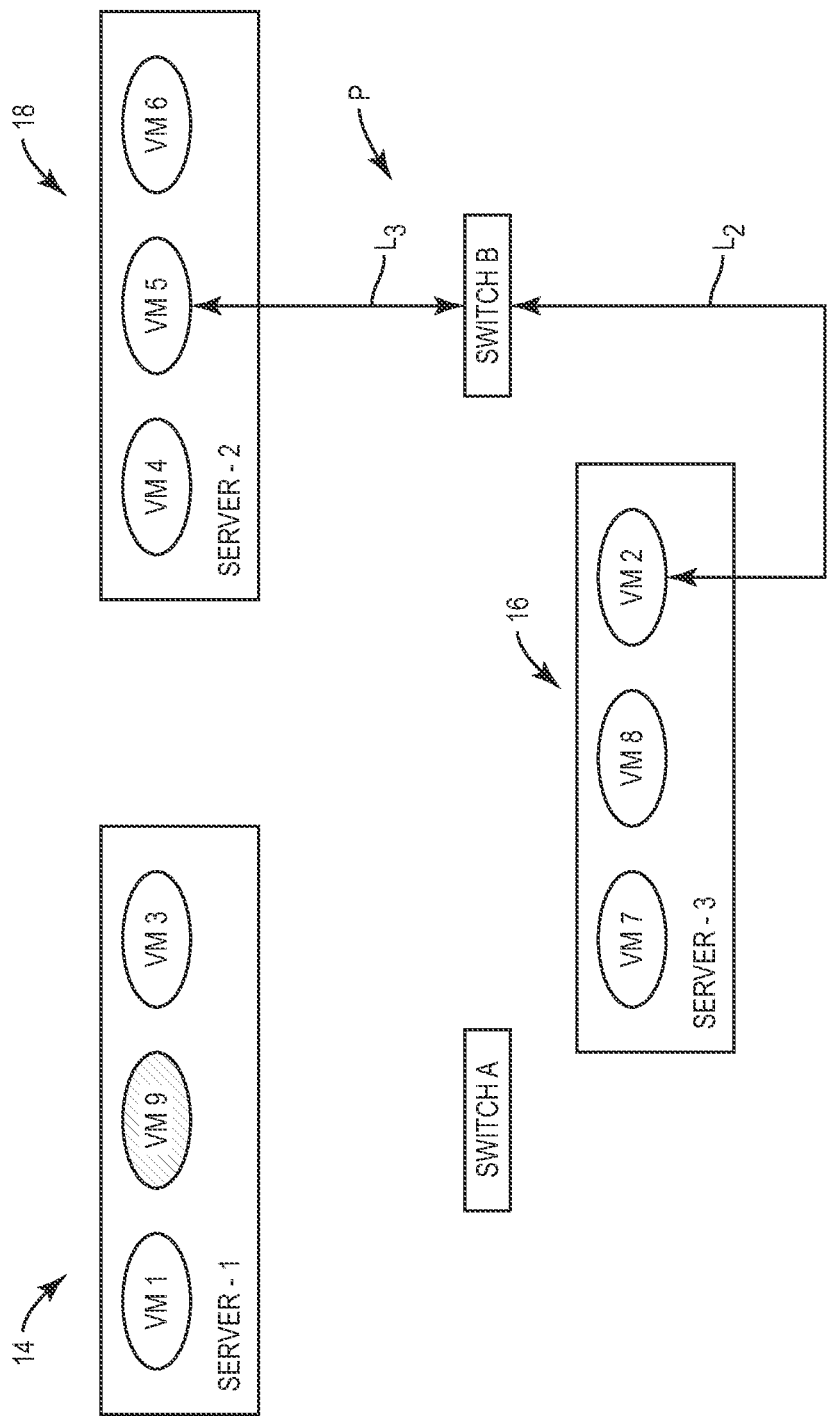

FIGS. 3A-3B are block diagrams that graphically illustrate the migration of a VM according to one embodiment of the present invention. As seen in FIG. 3A, each of the servers 14, 16, 18 have three VM sites or locations. Server 14 has sites VM1, VM2, and VM3, while server 16 has sites VM7, VM8, and VM9. Server 18 has sites VM4, VM5, and VM6. Each of the VM sites, with the exception of VM9 in server 16, is "in-service" and handling traffic. Prior to the migration, the VM at site VM2 is communicating with the VM at site VM5 via a path P comprised of 3 constituent links $L_1$-$L_3$ and two different switches. A first one of the links $L_1$ extends between VM2 and switch "A", a second link $L_2$ between the switches "A" and "B," and the final link $L_3$ between switch "B" and VM5.

As previously stated, the management system 20 is connected to each of the servers 14, 16, 18, and measures each f the links $L_1$-$L_3$ to determine if one or more of the links are congested. In this case, the management system 20 determines that at least one of the links $L_1$-$L_3$ is congested, and in response, models the traffic matrix as if the virtual machine at site VM2 was migrated to site VM9. The result of the migration, seen in FIG. 3B, is that the VMs at sites VM2 and VM5 will now communicate over a fewer number of links and through one less network element. Such a migration could result in a significant bandwidth savings in addition to alleviating network congestion.

Figure 4:
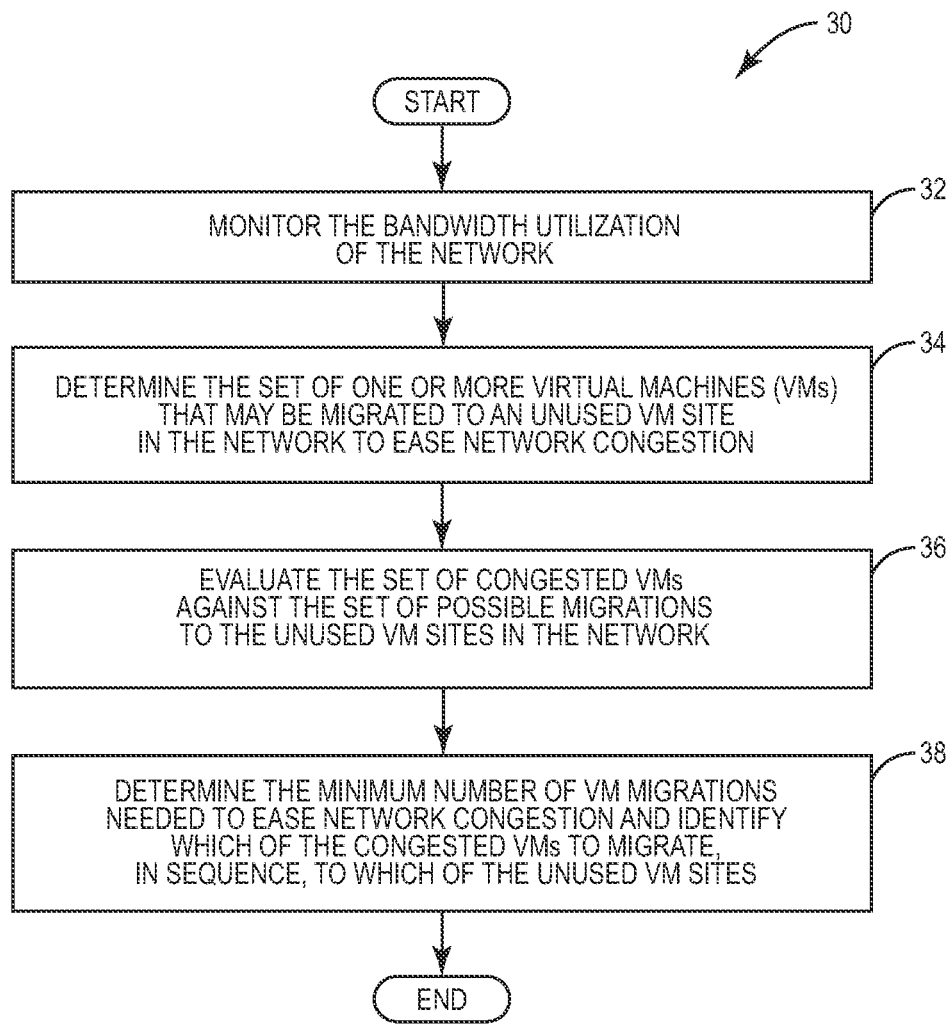
FIG. 4 is a flow chart illustrating the present invention according to one embodiment.

FIG. 4 is a flowchart illustrating a method 30 of performing the present invention according to one embodiment. Method 30 begins with the monitoring of the network for congestion. Particularly, the management system 20 monitors the bandwidth utilization by performing periodic measurements, or by receiving information regarding the bandwidth utilization, for example (box 32). As those of ordinary skill in the art will readily appreciate, methods of determining link bandwidth utilization are well known. Therefore, they are not described in detail herein. Assuming that congestion exists, a modeling function executed at the management system 20 determines the set of VMs that are communicating over the congested links (or paths). Some or all of these VMs are the VMs that may be migrated to ease the congestion and optimizing the network (box 34). Once identified, the modeling function at the management system 20 recursively evaluates this set of VMs against a set of possible migrations to the unused VM sites in the network (box 36). The result of the modeling function is the determination of the minimum number of VM migrations that are needed to ease the network congestion and re-optimize the network, as well as the identification of the particular VMs to migrate, in sequence, to the particular unused VM sites (box 38). With such information in hand, the data center operator can perform the migrations.

Figure 5:
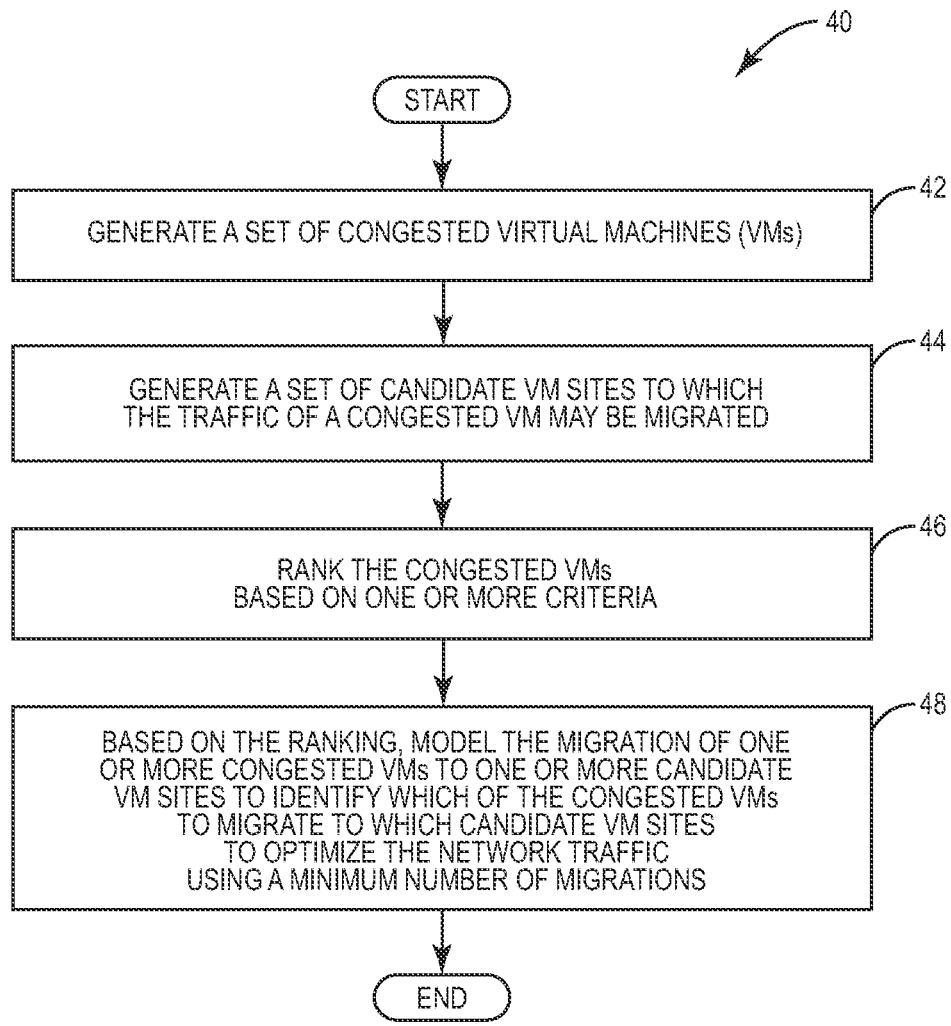
FIG. 5 is a flow chart illustrating a method of performing the present invention according to one embodiment.

FIG. 5 is a flow chart illustrating a method 40 of recursively performing a method of the present invention in more detail. Particularly, the management system 20, via the modeling function, generates the set of congested VMs (box 42). As stated above, such "congestion" is determined by monitoring the bandwidth utilization of the links that connect the VMs in the network. If a VM is communicating with one or more other VMs over a congested link, the management system 20 considers the VM to be a "congested VM," and places it in the set of congested VMs.

Once the set of congested VMs are identified, the modeling function generates a set of "candidate VM sites" (box 44). Each candidate VM site comprises an unused or idle VM site in the network to which the traffic of a congested VM may be migrated. The modeling function then ranks the congested VMs based on a set of one or more predefined criteria (box 46), and recursively processes the congested VMs based on that ranking to model the migration of one or more congested VMs to one or more of the identified candidate VM sites (box 48). As previously stated, the result of the processing identifies which particular congested VMs to migrate to which particular candidate VM sites to ease congestion and optimize the network using a minimum number of migrations. In one embodiment, the modeling function also identifies the sequence in which the migrations should occur.

FIGS. 6A-6E are flow charts illustrating the recursive process of the present invention in more detail. Beginning with FIG. 6A, a method 50 first initializes a set of "congested VMs" to the NULL SET. The method then determines which of the plurality of the VMs in the network are communicating over at least one congested link or path, and thus, can be migrated to an unused VM site to ease that congestion and optimize the network. For example, the modeling function may place the identity of each VM that is communicating over a congested link or path in a list or other data structure, and call the structure the set of congested VMs (box 52). Then, the number of congested VMs in the set is determined (box 54). If no congested VMs were identified (i.e., the set of congested VMs remains initialized to the NULL SET), the process ends because there are no congested VMs. However, if there are one or more congested VMs in the set, the modeling function calculates, for each congested VM in the set, a "congestion index" (box 56), a "correction index" (box 58), and a "consumption index" (box 60). These calculated indices are values that the modeling function will use to rank the congested VMs for later processing.

More specifically, the congestion index is a scalar value that is computed by counting the number of congested links over which a given congested VM communicates with each of its peer VMs in the network. For example, referring back to the topology of FIG. 2, consider communications between VM1 and VM2 over links L. If only a single hop or link in the path connecting VM1 and VM2 were congested, the congestion index for VM1 would be a value of '1'. However, if a total of 4 links in the path connecting VM1 and VM2 were congested, the congestion index for VM1 would be '4'.

The "correction index" is also a scalar value computed by counting the number of links that would no longer be congested (i.e., their measured bandwidth utilization would drop below the established bandwidth utilization threshold) if the traffic at the congested VM were to drop to zero. Thus, continuing with the above example, the modeling function would simulate the removal of traffic sent from and received by VM1. If the simulation reveals that all links L in the path connecting VM1 to VM2 would no longer be congested (assuming the path has 4 links or hops), then the correction index for VM1 is '4'. Similarly, if the simulation reveals that only one of the links would no longer be congested, the correction index for VM1 would be '1'.

The "consumption index" is a value that defines a cumulative bandwidth-distance value for the set of paths between a given congested VM at its current location or site in the network and each of its peer VMs. The value is computed based on the traffic matrix established when the VM was initially added to the network, and may be calculated using the following equation.

$$BW_{VMa \to VMb}(L_{VMa \to VMb}) + BW_{VMa \to VMc}(L_{VMa \to VMb})$$

where:
$BW_{VMa \to VMb}$ denotes the bandwidth needed for VMa to communicate with VMb;
$BW_{VMa \to VMc}$ denotes the bandwidth needed for VMa to communicate with VMc;
$L_{VMa \to VMb}$ denotes the number of constituent links in the path connecting VMa and VMb; and
$L_{VMa \to VMb}$ denotes the number of constituent links in the path connecting VMa and VMb.

For example, if VM1 in FIG. 2 requires 5 Mbits in bandwidth to communicate with VM2 over 3 links, and 1 Mbit of bandwidth to communicate with VM4 over 2 links, then the consumption index would be calculated as:

5 Mbits(3 links)+1 Mbit(2 links)=17 Mbit-hops.

Figure 6A:
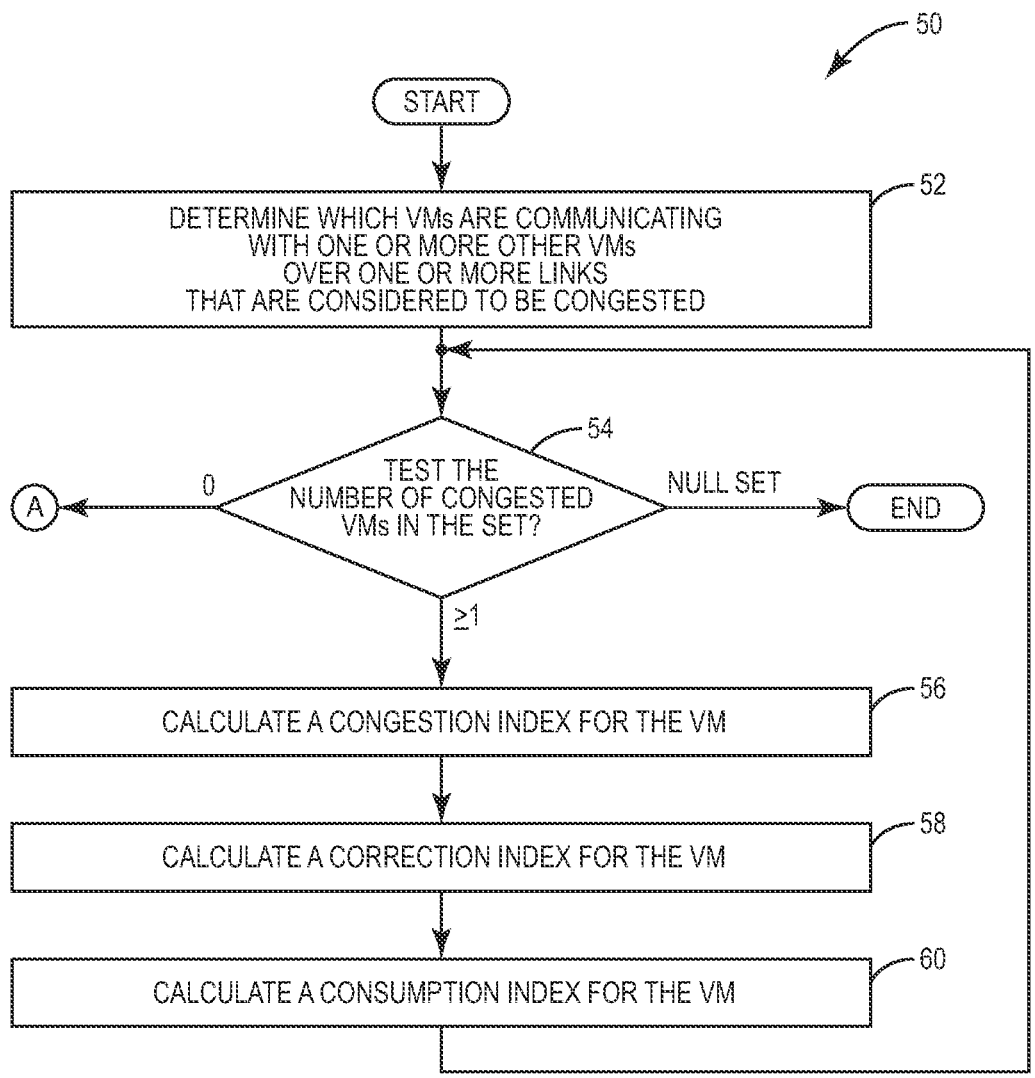
FIGS. 6A-6E are flow charts illustrating a recursive method used to determine and identify a minimum number of VMs to migrate to unused VM sites, as well as the sequence in which to migrate identified VMs.
Figure 6B:
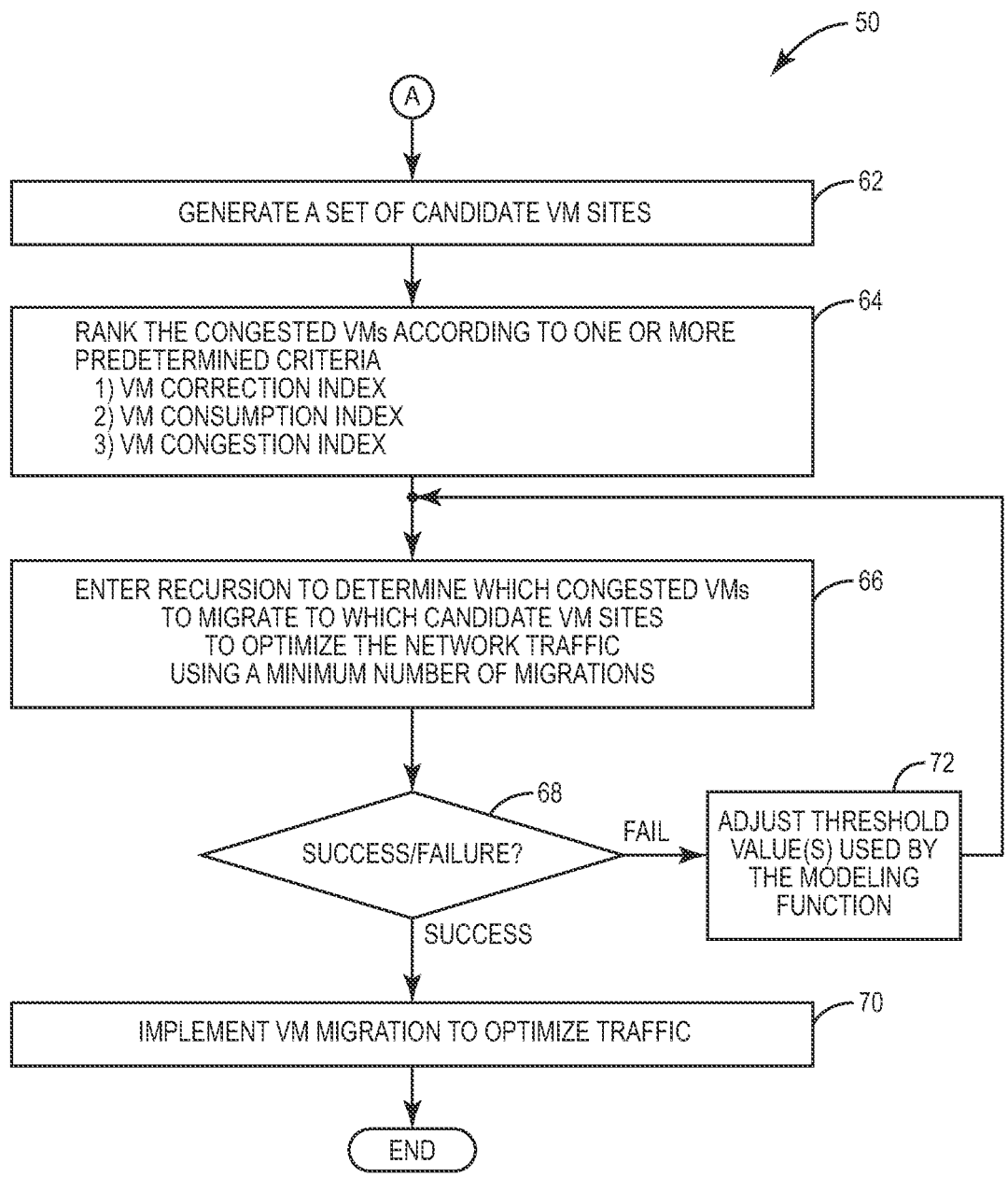

As stated above, these indices are calculated for each congested VM in the set of congested VMs. Once all congested VMs have been processed to calculate respective index values, the modeling function identifies one or more unused VM sites in the network that may host one of the congested VMs (FIG. 6B).

Particularly, the modeling function will typically have access to a list or some other data structure that identifies the various unused VM sites in the network. From this list, the modeling function generates a set of "candidate" VM sites (box 62). Of course, if there are no unused VM sites in the network, method 50 ends because there will be no place in which to migrate the traffic of a congested VM. Once the set of candidate VMs are known, the modeling function ranks the congested VMs based on the predetermined criteria (box 64). In this embodiment, the congested VMs are ranked according to each of the calculated index values. Particularly, the congested VMs are ranked first according to their respective calculation indices, then according to their respective consumption indices, and finally according to their respective congestion indices. Once ranked, the modeling function recursively evaluates the congested VM set against the set of possible migrations to the set of the candidate VMs (box 66). If the recursion returns a successful result (box 68), the data center operator will know the minimum number of congested VMs that need to be migrated to ease the congestion, the identities of the particular congested VMs that should be migrated to the particular candidate VM sites, and the sequence in which the migrations should occur. The data center operator could thereafter implement the migration of the identified congested VMs (box 70). If the process returns a fail indicator (box 68), then the modeling function was not able to determine an acceptable solution. In such cases, the method 50 may simply end so that no migrations need occur. However, if desired, the data center operator can decide to simply relax the predetermined criteria used in the recursion and execute the process once again to determine the information (box 72). For example, the operator may permit an increase in network cost in the form of an increase of consumption index to alleviate congestion.

Figure 6C:
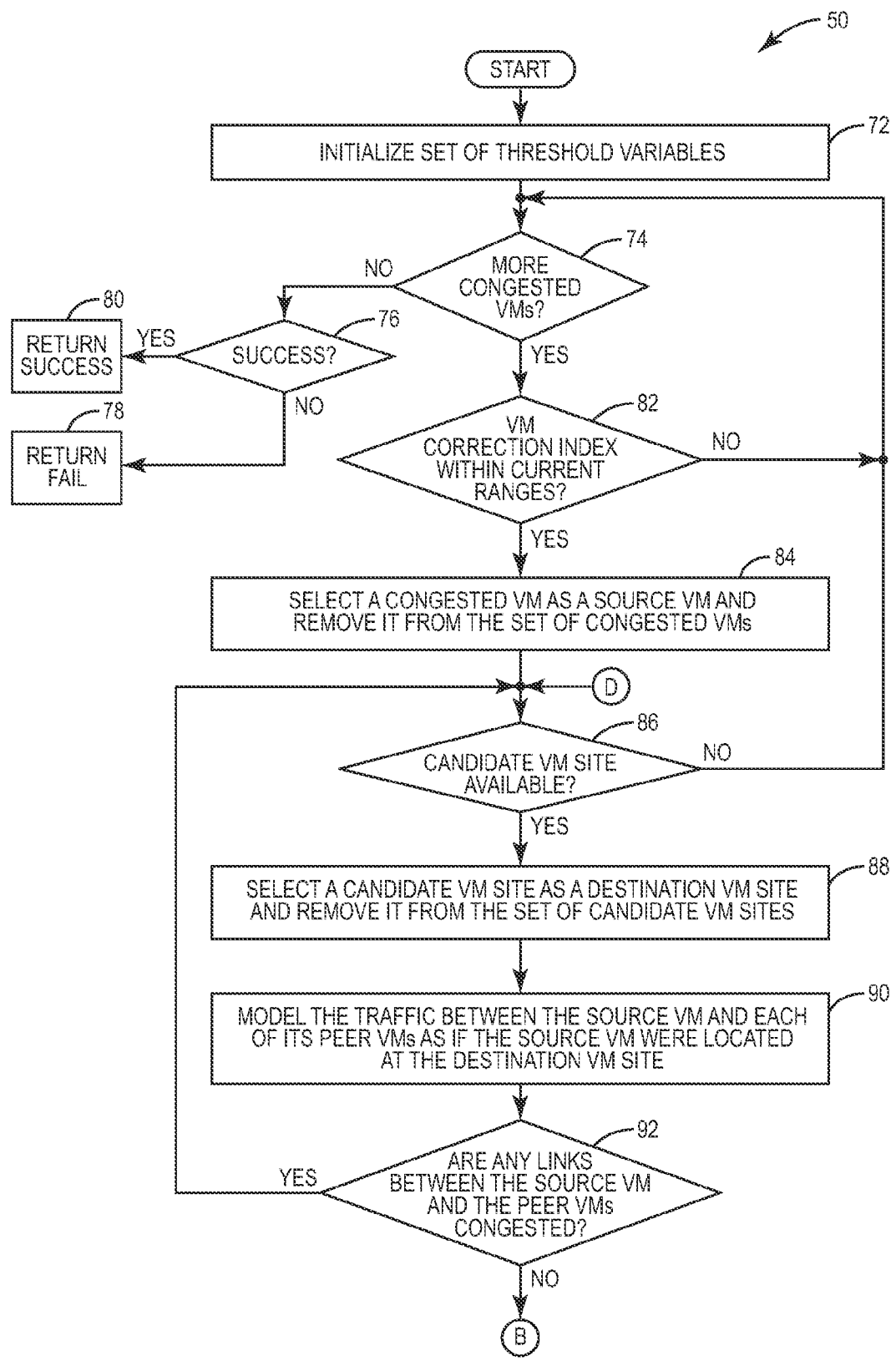
Figure 6D:
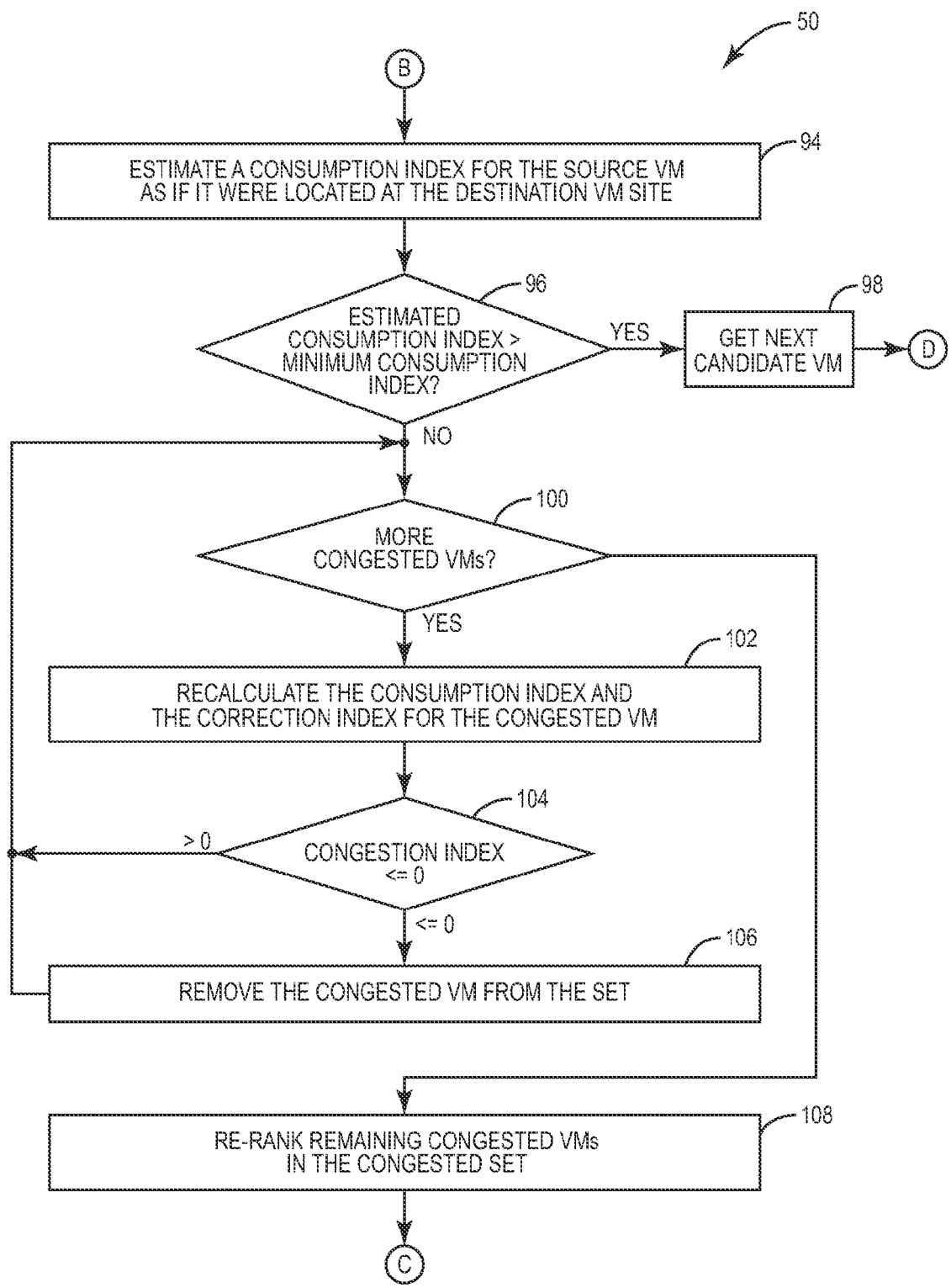
Figure 6E:
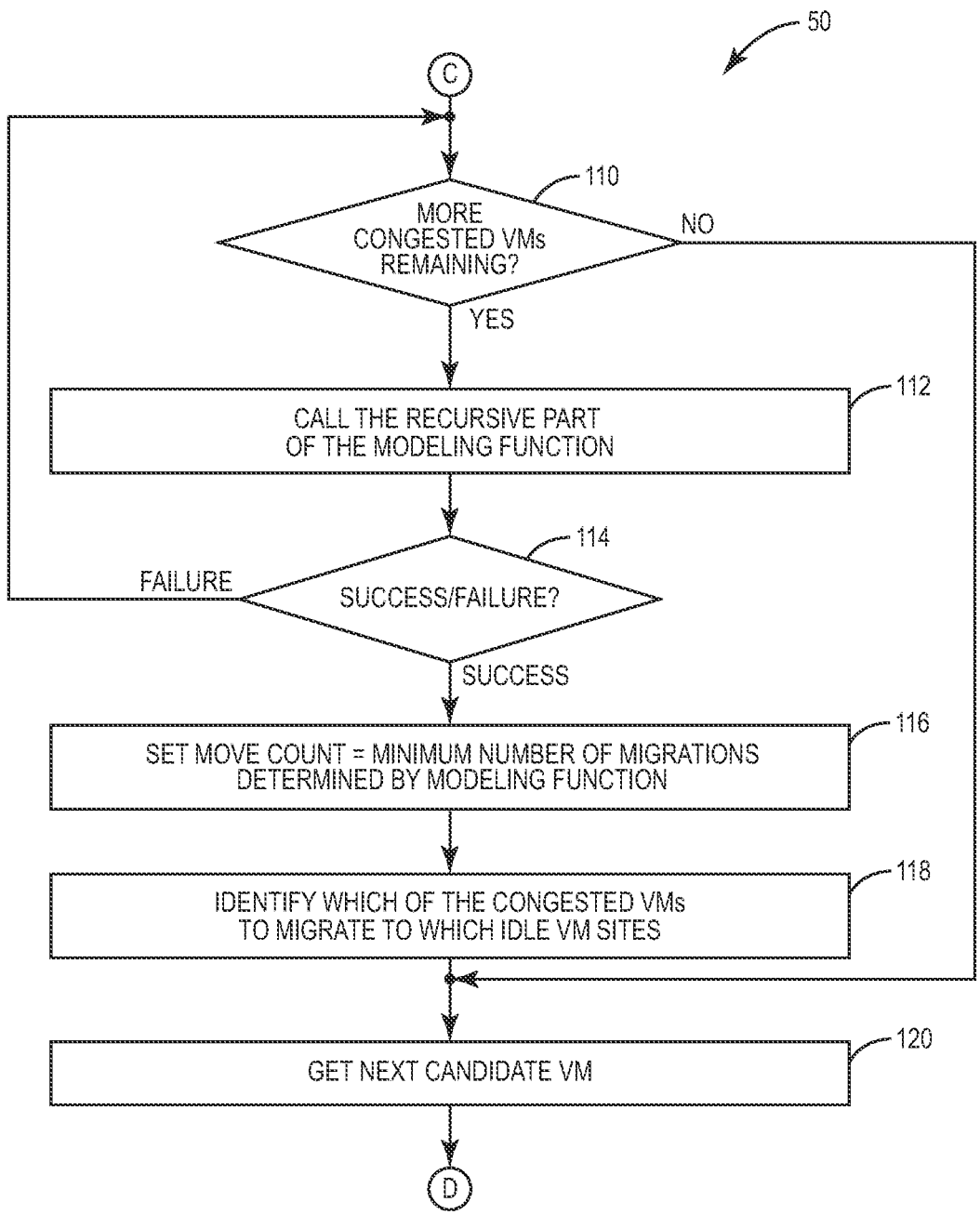

FIGS. 6C-6E are flow charts illustrating the recursive portion of method 50. As seen in FIG. 6C, the recursive part of method 50 begins with the initialization of several threshold variables. The number and type of variables initialized may be any that are needed or desired, but in one embodiment, include an initial "move count," a set of congested VMs to be moved, and a minimum consumption index threshold value. The move count could be set initially to a very large value (e.g., 1,000,000), but will eventually contain a value that defines the minimum number of congested VMs for migration. The set of VMs to be moved could be initialized to the NULL SET, and will contain the identities of the minimum number of congested VMs that should be moved. Finally, the minimum consumption index threshold should be set to an arbitrarily large value, and will be used, as seen below in more detail, to determine whether a given congested VM from the set of congested VMs should be considered for a possible migration to a given candidate VM.

Once initialized, the number of congested VMs is determined. As long as at least one congested VM remains in the set of congested VMs (box 74), processing to determine the minimum migration set will continue. As seen in later, the "NO" branch is executed when recursion ends and there are no more congested VMs to analyze. At this point, the recursive portion of method 50 determines whether the method has succeeded or failed at determining the minimum number of VMs for migration (box 76), and thus, returns either a fail indicator (box 78) or a success indicator (box 80). If successful, the move count variable will be set to the minimum number of migrations needed to ease congestion and optimize the network, and the set of VMs to be moved will contain the identities of the congested VMs that need migrating. Other data structures may be used to contain the identities of the candidate VM sites selected for the migration.

For each congested VM in the set of congested VMs (box 74), the modeling function determines whether the correction index for that VM is within a currently selected range (box 82). In one embodiment, the range is arbitrarily selected, but is selected so that only those congested VMs having the highest correction index values are analyzed by the recursion before other congested VMs having lower values. For example, consider the set of congested VMs in which some congested VMs have a correction index of '4,' while others have a correction index of '3,' '2,' 1,' or '0.' If the primary ranking is based on the correction index, then the range may be selected such that at each level of recursion the method will only examine those VMs in the current set being analyzed having the highest correction index, which in this case, is '4.' This check allows the modeling function to analyze the congested VMs that, if migrated, will likely have the most impact on returning the network to an acceptable state of bandwidth utilization. Additionally, in a fail scenario where an acceptable solution is not determined, it provides a means by which to establish the set of VM migrations that solve the maximum number of problems before relaxing the constraints.

Provided a given congested VM has a correction index within the selected range, the modeling function selects the congested VM (i.e., for modeling purposes) and removes it from the set of congested VMs (box 84). Then, the modeling function will determine whether there are any candidate VM sites available (box 86). If there is one or more candidate VM sites available (box 86), the modeling function selects a candidate VM site as a "destination" VM site for the congested VM (i.e., also for modeling purposes) and removes it from the set of candidate VM sites (box 88).

If no more candidate VM sites are available to be examined, it is likely that the recursion is finished, and thus, processing returns to retrieve another congested VM. Because no congested VMs are likely to be available at this point, the recursion ends either as a success or failure (boxes 74-80) as previously described.

The modeling function then models the traffic between the given congested VM, as if it were migrated to the candidate VM site, and its peer VMs, which remain at their original locations (box 90). If one or more links would become congested (box 92), the migration is considered to be problematic and another candidate VM site is selected and the process is repeated. Otherwise, the modeling function considers the placement of the congested VM at the candidate VM site in more detail (FIG. 6D). Particularly, the modeling function first estimates a consumption index for the given congested VM as if that VM were migrated to the selected candidate VM site (box 94). If the estimated consumption index is greater than the minimum consumption index value (box 96), then the congested VM, if migrated to the selected candidate VM site, would require more bandwidth resources than what has been determined to be the best solution so far. In these cases, the candidate VM site is no longer considered viable for the congested VM (box 98) and the process flow returns to select another candidate VM site (box 86—FIG. 6C). Otherwise, the modeling function adjusts the remaining congested VMs in the congested VM set as if the given congested VM were actually migrated to the candidate VM site. This allows the modeling function to determine the effect that migrating the given congested VMs would have on the other congested VMs and potentially remove them from consideration.

More particularly, for each congested VM remaining in the set of congested VMs (box 100), the modeling function re-calculates each consumption index and each correction index (box 102). If the re-calculated congestion index is less than or equal to '0' (box 104), that particular congested VM is removed from the set of congested VMs (box 106). If, however, the re-calculated congestion index is greater than 0 (box 104), that particular congested VM is left in the congested set of VMs for further processing. Once all the congested VMs have been processed, the remaining congested VMs (i.e., those having a re-calculated congestion index that is greater than 0) are re-ranked according to the predetermined criteria (box 108).

Then, for each remaining congested VM (box 110—FIG. 6E), the recursive part of method 50 is once again invoked (box 112). The recursion will process each of the remaining VMs, recursively (i.e., with each recursive iteration receiving a unique copy of the remaining set of congested VMs and the remaining set of candidate VMs to uniquely manipulate without impacting the sets in the invoking function), and return a success or fail indicator as previously described (box 114). At a predetermined level of conversion, the metrics of a successful search are compared with the metrics of the previous best successful search. Based on that comparison, the metrics associated with the most successful of the two searches is then selected and used in further processing. If successful, the modeling function compares the move count to the previous best minimum number of migrations determined by the modeling function (box 116), and if superior, identifies the congested VMs to migrate to the candidate VM sites (box 118). The method then returns to process the next congested VM in the set of congested VMs (box 86—FIG. 6C) until the set of congested VMs at the current index of correction is exhausted. At this point, a failure or a success is returned, along with the associated metrics and cumulative migrations.

The recursion continues, as stated above, until the modeling function determines either that no migrations can be made (i.e., failure), or that one or more migrations can be made to ease congestion. If migrations can be made, the recursion will have determined the minimum number of migrations needed to ease congestion and optimize the network, as well as identified which particular congested VMs to migrate to which particular candidate VM sites. Further, the modeling function will have identified the particular sequence in which to effect the migration of the identified congested VMs. With this information in hand, a data center operator can better understand how to ease congestion and optimize the network without having to alter the topology of the network.

Figure 7:
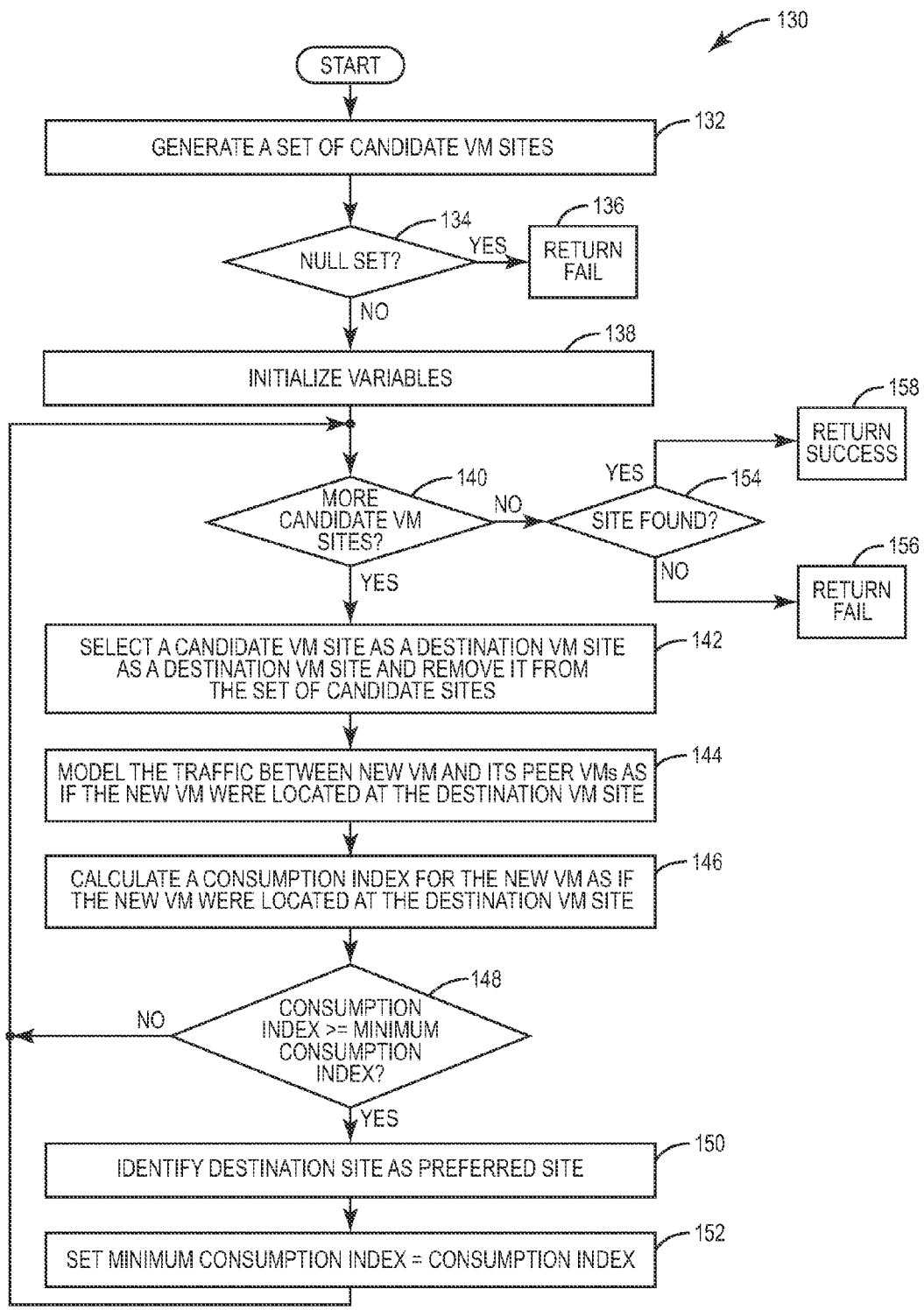
FIG. 7 is a flow chart illustrating a method of determining where in the network to add a new VM according to one embodiment of the present invention.

In addition to facilitating the migration of one or more in-service VMs communicating over congested links, the present invention may also be utilized to add a new VM to an unused VM site in the network as part of an existing group of communicating VMs in order to add capacity to the service. FIG. 7 is a flow chart illustrating a method 130 of adding a new VM to the network without having to alter the network topology. As seen in FIG. 7, the method 130, which may be performed at the management system 20 by the modeling function, first generates a set of candidate VM sites from the known list of unused VM sites (box 132). If there are no unused VM sites in the network (indicated by the NULL SET—box 134), the modeling function 130 returns a fail indicator and the method ends (box 136). However, provided there are one or more unused VM sites available in the network, the modeling function determines which of these sites is the most appropriate for the new VM.

Particularly, the modeling function initializes some variables to be used during the processing (box 138). These variables may be any variable desired; however, in one embodiment, the modeling function initializes a predetermined minimum consumption index threshold (e.g., −1). Then, the modeling function processes each candidate VM site in the set to determine the appropriate location for the new VM. More specifically, the modeling function selects a candidate VM site as a "destination" site for the new VM. The selected candidate VM site is also removed from the set of candidate VM sites (box 142). The modeling function then models the traffic that would occur between the new VM and each of its peer VMs, and calculates an estimated consumption index for the new VM, as if the new VM were installed and operating at the selected candidate VM site (boxes 144, 146). The estimated consumption index is then compared against the predetermined minimum consumption index threshold (box 148). If the estimated consumption index equals or exceeds this predetermined threshold, the modeling function identifies the candidate VM site as the preferred VM site for the new VM (box 150) and sets the minimum consumption index threshold equal to the estimated consumption index calculated for the new VM (box 152). The modeling function then gets the next candidate VM site in the set for processing (140).

Processing the candidate VMs in accordance with the method 130 of FIG. 7 is an iterative process. With each iteration, the minimum consumption index threshold may be set to a lower value, but only if the estimated consumption index for the new VM is lower than the current value for the threshold. This ensures that the best possible VM site in the network (i.e., the site that uses the least overall amount of bandwidth) is identified for the new VM. More particularly, the result of the process is the identification of an unused VM site in the network that can accept the new VM without causing the network to become congested, and at the lowest cost in terms of bandwidth utilization. Thus, once there are no more candidate VM sites to evaluate (box 140), the modeling function will determine whether an appropriate candidate VM site has been found (box 154). If not, the modeling function returns a fail indicator (box 156). Otherwise, the modeling function returns a success indicator (box 158) and identifies the candidate VM site to the data center operator.

In another aspect, the present invention also allows a data center operator to determine where to add a group of new VMs to corresponding unused VM sites in the network. As above, the modeling function executing at the management system 20 may perform the method to identify the most appropriate VM sites in the network.

Figure 8A:
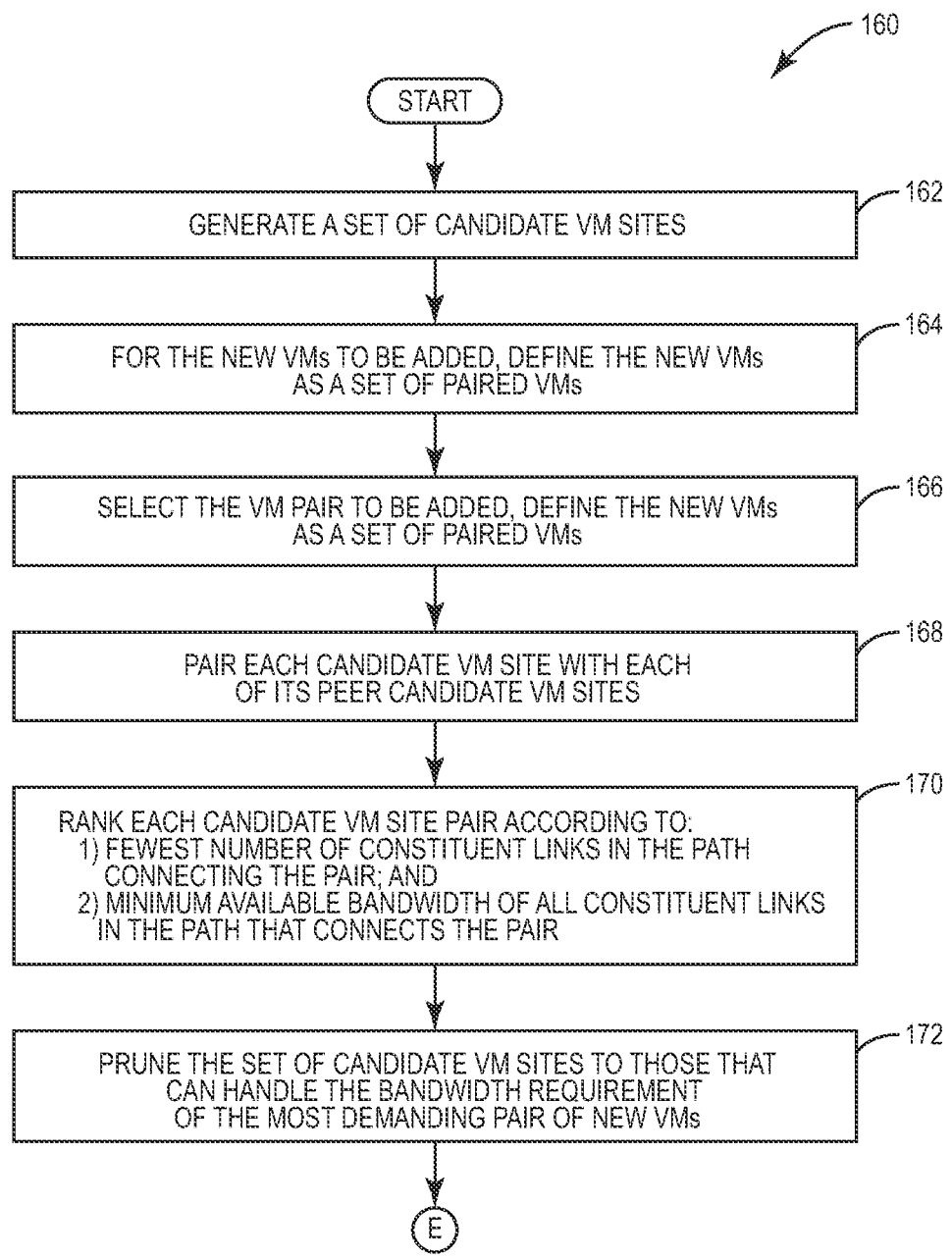
FIGS. 8A-8C are flow charts illustrating a method for determining where in the network to add a plurality of VMs according to one embodiment of the present invention.
Figure 8B:
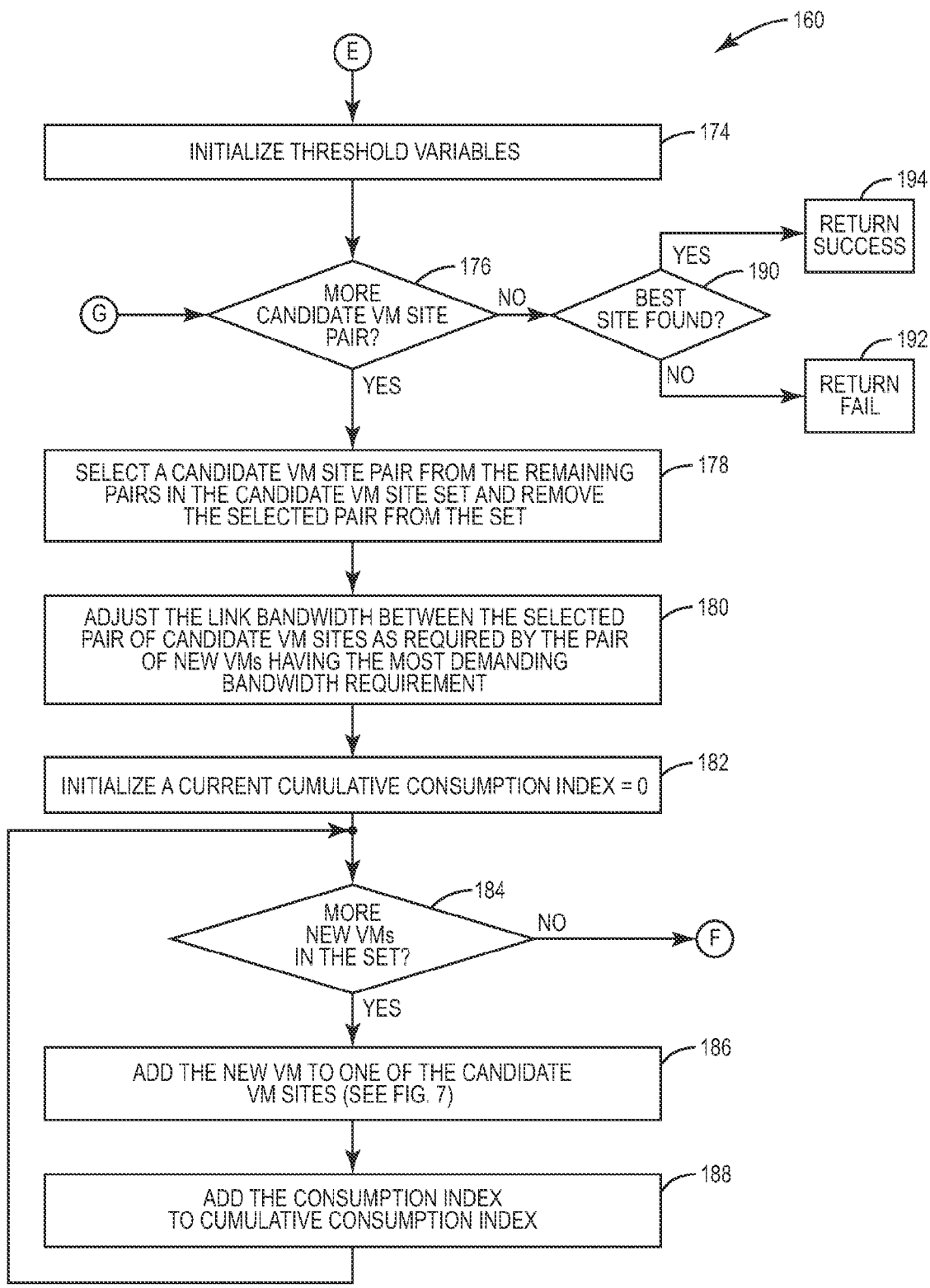
Figure 8C:
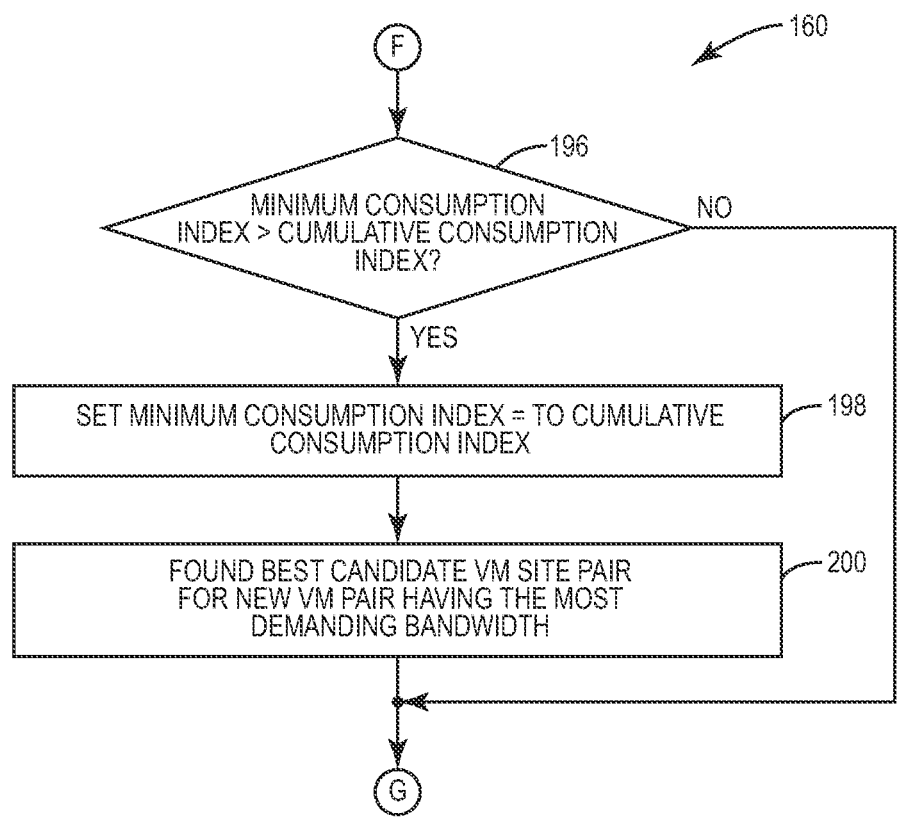

As seen in FIGS. 8A-8C, method 160 begins with the modeling function generating a set of candidate VM sites (box 162). The modeling function is also made aware of the identities of a plurality of new VMs that are to be added to the network. Each of these new VMs has a bandwidth requirement that must be considered when determining an appropriate candidate VM site. Thus, for each new VM to be added to the network, the modeling function defines the VMs as sets of paired VMs (box 164).

Then, the modeling function selects the VM pair having the most demanding bandwidth requirement and removes that pair of VMs from the set (box 166). The modeling function then pairs each candidate VM site with each of its peer candidate VM sites (box 168), and ranks each pair of candidate VM sites according to predetermined criteria. Any criteria needed or desired may be used to rank the candidate VM site pairs. However, in this embodiment, the candidate VM site pairs are ranked based on the fewest number of constituent links connecting the pair (i.e., the shortest path), and the minimum of the maximum available bandwidth of all constituent links in a path connecting the pair (box 170). Once ranked, the modeling function prunes the set of candidate VM sites by removing those pairs that are not able to handle the bandwidth requirements of the most demanding pair of new VMs (box 172). The remaining set of candidate VM site pairs will then be evaluated to determine which, if any, will be the site for the new VM pair.

The modeling function next initializes some threshold variables that will be utilized during the processing (FIG. 8B—box 174), and begins processing each remaining candidate VM site pair. The modeling function arbitrarily selects a pair of candidate sites remaining in the set and removes that pair from the set (box 178).

The modeling function next adjusts the link bandwidth between the selected pair of candidate VM sites in accordance with the pair of new VM sites having the most demanding bandwidth (box 180), and initializes a current cumulative consumption index for the new VM pair to '0' (box 182). Then, for each of the remaining VMs to be added (box 184), the modeling function adds the new VM to one of the selected candidate VM sites (box 186). By way of example, the modeling function may perform the method previously described in FIG. 7 to add the new VM. In that method, the modeling function calculated an estimated consumption index for the new VM. In accordance with one embodiment of the present invention, the estimated consumption index is added to the cumulative consumption index (box 188) and compared to the predetermined minimum consumption index threshold (FIG. 8C—box 196). If the comparison reveals that the cumulative consumption index equals or exceeds the minimum consumption index threshold, the modeling function returns to select another candidate VM site pair for analysis (FIG. 8B—box 176). Otherwise, the modeling function sets the minimum consumption index threshold to the cumulative congestion index (box 198) and determines that it has found a new "best" candidate VM site pair for the new VM pair having the most demanding bandwidth requirement (box 200). At the end of each iteration, the modeled changes to the network are backed out to the values established prior to trying the different solutions.

The determination that the modeling function has found the best candidate VM site is not a final determination until all candidate VM site pairs are processed. Therefore, the modeling function will store the identity of the candidate VM site pair in memory. Upon exhausting the set of candidate VM site pairs (box 176—FIG. 8B), the modeling function will determine if, during processing, it found the best available VM sites (box 190). If not, the modeling function returns a fail indicator (box 192). Otherwise, the modeling function returns a success indicator (box 194) and identifies the best VM site pair in the network for the VM pair having the most demanding bandwidth requirements. Thereafter, appropriate candidate VM sites for the remaining new VMs may be determined using the method previously described in FIG. 7. It should be noted that the algorithm is simply an exhaustive search that utilizes the basic primitives associated with the other addition and optimization options.

Figure 9:
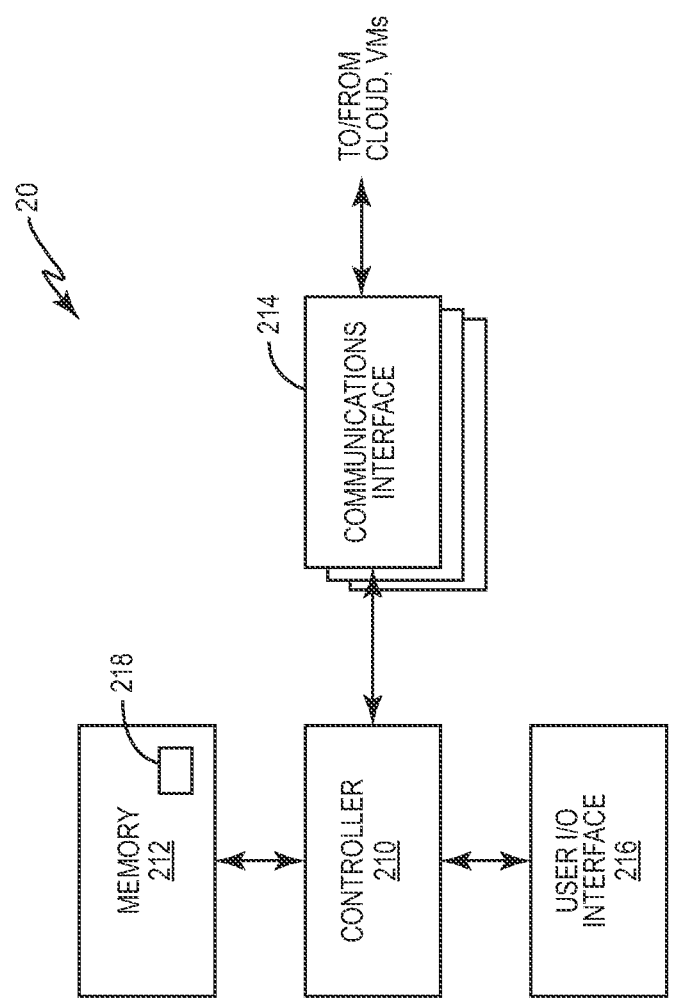
FIG. 9 is a block diagram illustrating some components of a management system configured to determine and identify a minimum number of VMs to migrate to unused VM sites, as well as the sequence in which to migrate identified VMs.

FIG. 9 is a functional block diagram illustrating some components of an exemplary management system 20 configured according to one embodiment of the present invention. As seen in FIG. 9, the management system comprises a programmable controller 210 operatively coupled to one or more communications interfaces 212, a User Input/Output Interface 214, and a memory 216.

The programmable controller 210 may comprise any sequential state machine operative to execute machine instructions stored as machine-readable computer programs in memory 212, such as one or more hardware-implemented state machines (e.g., in discrete logic, FPGA, ASIC, etc.); programmable logic together with appropriate firmware; one or more stored-program, general-purpose processors, such as a microprocessor or Digital Signal Processor (DSP), together with appropriate software; or any combination thereof.

The memory 212 may comprise any non-transient, machine-readable media known in the art or that may be developed, including but not limited to magnetic media (e.g., floppy disc, hard disc drive, etc.), optical media (e.g., CD-ROM, DVD-ROM, etc.), solid state media (e.g., SRAM, DRAM, DDRAM, ROM, PROM, EPROM, Flash memory, etc.), or the like. Generally, the memory 212 stores data and computer program logic that is executed on the controller 210 to control the functions of the management system 20. In one embodiment, for example, memory 212 stores a modeling function 218.

The modeling function 218 may be written in any code known in the art (e.g., C/C++), and when executed by controller 210, causes the management system 20 to monitor the network for congested links and/or paths, as previously described. Upon detecting such congestion, the modeling function 218 contains the code and data necessary to cause the controller to determine and identify a minimum number of congested VMs to migrate to particular unused VM sites, as well as a particular sequence in which a data center operator may perform the migration. In addition to facilitating the migration of an "in-service" VM, the modeling function also contains the code and data to control the management system to select one or more appropriate unused VM sites in the network for one or more new VMs to be placed into service in the network, as previously described.

The communications interface 214 comprises one or more ports, and includes the circuitry and software needed for the management system 20 to interface with the one or more of the servers 14, 16, 18, via the IP network 12. In operation, the management system 20 may send commands to the servers 14, 16, 18 to cause them to make and/or report measurements regarding their respective VMs and/or the links that connect their respective VMs. In some embodiments, the management system 20 does not generate the commands, but instead, passively receives such measurements periodically via the communications interface(s). As stated above, the modeling function 218 stored in memory 212 uses these measurements to determine whether congestion exists in the network, and trigger the execution of the recursive function that provides the data center operator with the information needed to migrate or add one or more VMs, as previously described.

The User Input/Output interface 216 may contain any of a variety of devices designed to allow a user, such as a data center operator, to interface with and control the operation of the management system. In one embodiment, the user I/O interface 216 includes a display device that displays information regarding the migration of VMs in the network, and/or the addition of new VMs to the network, as determined by the modeling function 218.

The present invention provides benefits to data center operators associated with engineering network traffic that conventional methods do not. For example, with the present invention, a data center operator will only have to migrate the fewest number of VMs necessary to ease congestion and optimize the network. Thus, the present invention provides a method that is not as time consuming as the conventional mechanisms.

Another benefit not available with conventional methods is that, according to the present invention, the data center operator is provided with the identities of the VMs that must be migrated, as well as the identities of the unused VM sites to which to migrate the VMs. Moreover, the sequence in which to perform the migration is also beneficial. With this information, a data center operator can migrate and/or add VMs to ease congestion and optimize traffic without having to alter the current network topology, and in a manner that is far less expensive than conventional methods.

The present invention may, of course, be carried out in other ways than those specifically set forth herein without departing from essential characteristics of the invention. Therefore, the present embodiments are to be considered in all respects as illustrative and not restrictive, and all changes coming within the meaning and equivalency range of the appended claims are intended to be embraced therein.

What is claimed is:

1. A method of optimizing traffic in a communications network, the method comprising:
    monitoring traffic communicated by a plurality of Virtual Machines (VMs) over one or more paths through the network, each path comprised of one or more constituent links;
    generating a set of candidate VM sites, each candidate VM site comprising an unused VM site in the network;
    generating a set of congested VMs from the plurality of VMs in the network, wherein each congested VM is determined to be communicating with at least one other VM over a path having at least one congested link;
    ranking the congested VMs based on one or more predefined criteria; and
    modeling the migration of one or more congested VMs to one or more candidate VM sites to:
        determine a minimum number of congested VMs to migrate to corresponding candidate VM sites to optimize the traffic through the network; and
        identify which congested VMs to migrate to which candidate VM sites.

2. The method of claim 1 wherein monitoring traffic in a communications network comprises analyzing a bandwidth utilization for one or more links comprising a path communicatively connecting a given pair of VMs.

3. The method of claim 1 wherein generating the set of congested VMs comprises adding a VM to the set of congested VMs if a bandwidth utilization for a link in a path connecting the VM to a peer VM equals or exceeds a first predetermined threshold.

4. The method of claim 1 further comprising calculating, for each congested VM:
- a congestion index by counting the number of congested links in the one or more paths communicatively connecting a congested VM to its peer VMs in the network;
- a correction index by computing the number of congested links that would no longer be congested if the traffic being communicated from the congested VM was removed from the network; and
- a consumption index as a function of cumulative bandwidth utilization summed over all of the links in the paths connecting the congested VM to each of its peer VMs.

5. The method of claim 4 wherein ranking the congested VMs based on one or more predetermined criteria comprises ordering the set of congested VMs based on one or more of the correction index, the consumption index, and the congestion index.

6. The method of claim 1 wherein modeling the migration of one or more congested VMs comprises recursively searching the set of potential VM migrations by modeling the migration of one or more of the congested VMs to selected candidate VM sites based on the ranking of the congested VMs.

7. The method of claim 6 wherein modeling the migration of one or more of the congested VMs based on the ranking of the congested VMs comprises modeling the migration of those congested VMs that have a ranking exceeding a predetermined value.

8. The method of claim 1 wherein modeling the migration of one or more congested VMs to one or more candidate VM sites further comprises determining a sequence in which to migrate the identified congested VMs to the identified candidate VM sites.

9. The method of claim 1 wherein determine a minimum number of congested VMs to migrate to corresponding candidate VM sites comprises:
- selecting a range of correction index values; and
- for each congested VM having a correction index within the selected range of correction index values, determining a set of possible candidate VM sites to which to migrate the congested VM.

10. The method of claim 9 wherein determining the set of possible candidate VM sites to which to migrate the congested VM comprises modeling the migration of the congested VM to a first candidate VM site.

11. The method of claim 10 further comprising modeling the migration of the congested VM to a second candidate VM site if migrating the congested VM to the first candidate VM site would:
- cause one or more other links in the network to become congested;
- increase the congestion on one or more of the links connecting the congested VM to one or more of its peer VMs; or
- cause the congested VM to have a consumption index that exceeds either its current consumption index, or exceed a predefined minimum consumption index.

12. The method of claim 10 further comprising:
- determining whether migrating the congested VM to the first candidate VM site would ease congestion on one or more other links in the network; and
- if the migration would ease congestion on the one or more other links:
  - updating values for each of the remaining congested VMs in the set of congested VMs to indicate the eased congestion; and
  - removing a remaining congested VM from the set of congested VMs if the updated values for the remaining congested VM meets or exceeds a predetermined threshold.

13. The method of claim 12 wherein modeling the migration of one or more congested VMs to one or more candidate VM sites comprises:
- re-ranking the remaining congested VMs based on the predetermined criteria; and
- based on the re-ranking sequence and on a predefined exit criteria, recursively processing the remaining congested VMs with respect to the candidate VM sites to:
  - determine the minimum number of congested VMs to migrate to the corresponding candidate VM sites to optimize the traffic through the network;
  - identify which of the remaining congested VMs to migrate to which of the candidate VM sites; and
  - identify a sequence in which to migrate the identified congested VMs to the identified candidate VM sites.

14. The method of claim 1 further comprising displaying the identification of the congested VMs and the candidate VM sites to the user on a display.

15. A network element configured to optimize traffic in a communications network, the network element comprising:
- a communications interface configured to send data to and receive data from a plurality of Virtual Machines (VMs) communicating over one or more paths through the network, each path comprised of one or more constituent links; and
- a programmable controller comprising a processor circuit configured to:
  - monitor traffic communicated by the plurality of VMs over the network paths;
  - generate a set of candidate VM sites, each candidate VM site comprising an unused VM site in the network;
  - generate a set of congested VMs from the plurality of VMs in the network, wherein each congested VM is determined to be communicating with at least one other VM over a path having at least one congested link;
  - rank the congested VMs based on one or more pre-defined criteria; and
  - model the migration of one or more congested VMs to one or more candidate VM sites to:
    - determine a minimum number of congested VMs to migrate to corresponding candidate VM sites to optimize the traffic through the network; and
    - identify which congested VMs to migrate to which candidate VM sites.

16. The network element of claim 15 wherein the controller is further programmed to analyze bandwidth utilization for one or more links comprising a path communicatively connecting a given pair of VMs.

17. The network element of claim 15 wherein to generate the set of congested VMs, the controller is further configured to add a VM to the congested set of VMs if a bandwidth utilization for a link in a path connecting the VM to a peer VM equals or exceeds a first predetermined threshold.

18. The network element of claim 15 wherein the controller is further configured to calculate, for each congested VM:

a congestion index indicating the number of congested links in the one or more paths communicatively connecting a congested VM to its peer VMs in the network;

a correction index indicating the number of congested links that would no longer be congested if the traffic being communicated from the congested VM was removed from the network; and a consumption index indicating a cumulative bandwidth utilization summed for the congested VM over all the links in the paths connecting the congested VM to each of its peer VMs.

19. The network element of claim 18 wherein the controller is further configured to rank the congested VMs based on one or more of the correction index, the consumption index, and the congestion index.

20. The network element of claim 15 wherein the controller is further configured to recursively search the set of potential VM migrations by modeling the migration of one or more of the congested VMs to selected candidate VM sites based on the ranking of the congested VMs.

21. The network element of claim 20 wherein the controller is further configured to model the migration of the congested VMs that have a ranking exceeding a predetermined value.

22. The network element of claim 15 wherein the controller is further configured to determine a sequence in which to migrate the identified congested VMs to the identified candidate VM sites.

23. The network element of claim 15 wherein to determine the minimum number of congested VMs to migrate to corresponding candidate VM sites, the controller is further configured to:

select a range of correction index values; and for each congested VM having a correction index within the selected range of correction index values, determine a set of possible candidate VM sites to which to migrate the congested VM.

24. The network element of claim 23 wherein the controller is further configured to model the migration of the congested VM to a first candidate VM site.

25. The network element of claim 24 wherein the controller is further configured to model the migration of the congested VM to a second candidate VM site if migrating the congested VM to the first candidate VM site would:

cause one or more other links in the network to become congested;

increase the congestion on one or more of the links connecting the congested VM to one or more of its peer VMs; or cause the congested VM to have a consumption index that exceeds either its current consumption index, or exceed a predefined minimum consumption index.

26. The network element of claim 24 wherein the controller is further configured to:

determine whether migrating the congested VM to the first candidate VM site would ease congestion on one or more other links in the network; and if the migration would ease congestion on the one or more other links:

update values for each of the remaining congested VMs in the set of congested VMs to indicate the eased congestion; and remove a remaining congested VM from the set of congested VMs if the updated values for the remaining congested VM equals or exceeds a predetermined threshold.

27. The network element of claim 26 wherein the controller is further configured to:

re-rank the remaining congested VMs based on the predetermined criteria; and based on the re-ranking sequence and on a predefined exit criteria, recursively process the remaining congested VMs with respect to the candidate VM sites to:

determine the minimum number of congested VMs to migrate to the corresponding candidate VM sites to optimize the traffic through the network;

identify which of the remaining congested VMs to migrate to which of the candidate VM sites; and identify a sequence in which to migrate the identified congested VMs to the identified candidate VM sites.

28. The network element of claim 15 further comprising a display, and wherein the controller is further configured to output the identification of the congested VMs and the candidate VM sites to the display for the user.

29. A method of optimizing traffic in a communications network having a plurality of Virtual Machines (VMs) communicating over paths comprised of one or more constituent links, the method comprising:

generating a set of candidate VM sites, each candidate VM site comprising an unused VM site in the network;

modeling a traffic matrix for the network as if a new VM to be added to the network were instantiated at a selected candidate VM site; and instantiating the new VM at the selected candidate site if the modeled traffic matrix indicates that one or more links connecting the new VM to its peer VMs would not be congested.

30. The method of claim 29 wherein modeling the traffic matrix for the network comprises determining resource requirements for the new VM at the candidate site.

31. The method of claim 30 wherein instantiating the new VM at the selected candidate site comprises instantiating the new VM if the resource requirements do not equal or exceed a minimum threshold.

32. The method of claim 29 further comprising:

counting a number of links that would exceed a predefined bandwidth threshold if the new VM were instantiated at the candidate site; and determining that one or more of the links in the network will become congested if the number of links counted equals or exceeds a predetermined threshold.

33. The method of claim 32 further comprising selecting another candidate site for the new VM if it is determined that one or more of the links in the network will become congested.

34. The method of claim 29 further comprising computing an estimated consumption index for the new VM as if the new VM were operating at the selected candidate site, the estimated consumption index indicating an estimated cumulative bandwidth utilization for the new VM over all the links in the paths that would connect the new VM to each of one or more peer VMs.

35. The method of claim 34 wherein instantiating the new VM at the selected candidate site further comprises instantiating the new VM if the estimated consumption index is less than a predetermined value.

36. A network element configured to optimize traffic in a communications network, the network element comprising:

a communications interface configured to send data to, and receive data from, a plurality of Virtual Machines (VMs) communicating over one or more paths through the network, each path comprised of one or more constituent links; and a programmable controller comprising a processor circuit configured to:
  generate a set of candidate VM sites, each candidate VM site comprising an unused VM site;
  model a traffic matrix for the network as if a new VM to be added to the network were instantiated at a selected candidate VM site; and
  indicate that the new VM should be instantiated at the selected candidate site if the modeled traffic matrix indicates that one or more of the links connecting the new VM to its peer VMs would not be congested.

37. The network element of claim 36 wherein to model the traffic matrix for the network, the controller is further configured to determine resource requirements for the new VM at the candidate site.

38. The network element of claim 37 wherein the controller is configured to indicate that the new VM should be instantiated at the selected candidate VM site if the resource requirements do not equal or exceed a minimum threshold.

39. The network element of claim 36 wherein the controller is further configured to:
  compute a number of links that would exceed a predefined bandwidth threshold if the new VM were instantiated at the candidate site; and
  determine that one or more of the links in the network will become congested if the number of links counted equals or exceeds a predetermined threshold.

40. The network element of claim 39 wherein the controller is further configured to select another candidate site for the new VM if the controller determines that one or more of the links in the network will become congested.

41. The network element of claim 36 wherein the controller is further configured to calculate an estimated consumption index for the new VM as if the new VM were operating at the selected candidate site to estimate a cumulative bandwidth utilization for the new VM over all the links in the paths that would connect the new VM to each of one or more peer VMs.

42. The network element of claim 41 wherein the controller is configured to indicate that the new VM should be instantiated if the estimated consumption index is less than a predetermined value.

43. A method of optimizing traffic in a communications network having a plurality of Virtual Machines (VMs) communicating over paths comprised of one or more constituent links, the method comprising:
  generating a set of candidate VM site pairs, each candidate VM site pair communicatively connected by a path comprised of one or more constituent links, each link having an available link bandwidth;
  identifying one or more pairs of new VMs to be instantiated in the network, each new VM pair having a bandwidth requirement;
  selecting the new VM pair having the highest bandwidth requirement;
  ranking each candidate VM site pair based on the number of links in the path connecting each candidate VM site pair; and
  selecting a candidate VM site pair for the selected VM pair based on the ranking.

44. The method of claim 43 wherein ranking each candidate VM site pair further comprises ranking each candidate VM site pair based on the available link bandwidth.

45. The method of claim 44 further comprising removing each candidate VM site pair from the set of candidate VM site pairs having an available link bandwidth that is less than bandwidth requirement of the selected VM pair.

46. The method of claim 43 wherein, for the remaining candidate VM site pairs, the method further comprises modeling a traffic matrix as if the selected VM site pair were instantiated at the selected candidate VM site pair.

47. The method of claim 46 further comprising adjusting the link bandwidth between the selected candidate VM site pairs based on the bandwidth requirement of the selected VM pair.

48. The method of claim 43 further comprising:
  calculating an estimated consumption index for each new VM to be added to the network; and
  summing the estimated consumption index to compute an estimated cumulative bandwidth utilization for the new VM over all the links in the paths that would connect the new VM to each of one or more peer VMs.

49. The method of claim 48 further comprising:
  comparing the estimated cumulative bandwidth utilization to a predefined threshold value; and
  identifying the selected candidate VM site pairs to receive the selected VM pair based on the comparison.

50. A network element configured to optimize traffic in a communications network, the network element comprising:
  a communications interface configured to send data to, and receive data from, a plurality of Virtual Machines (VMs) communicating over one or more paths through the network, each path comprised of one or more constituent links, each link having an available link bandwidth; and
  a programmable controller comprising a processor circuit configured to:
    identify one or more pairs of new VMs to be instantiated in the network, each new VM pair having a bandwidth requirement;
    select the new VM pair having the highest bandwidth requirement;
    rank each candidate VM site pair based on the number of links in the path connecting each candidate VM site pair; and
    select a candidate VM site pair for the selected VM pair based on the ranking.

51. The network element of claim 50 wherein the controller is further configured to rank each candidate VM site pair based on the available link bandwidth for the candidate VM site pair.

52. The network element of claim 51 wherein the controller is further configured to remove each candidate VM site pair having an available link bandwidth that is less than the bandwidth requirement of the selected VM pair.

53. The network element of claim 50 wherein, for the remaining candidate VM site pairs, the controller is further configured to model a traffic matrix as if the selected VM site pair were instantiated at the selected candidate VM site pair.

54. The network element of claim 53 wherein the controller is further configured to adjust the link bandwidth between the selected candidate VM site pairs based on the bandwidth requirement of the selected VM pair.

55. The network element of claim 50 wherein the controller is further configured to:
  calculate an estimated consumption index for each new VM to be added to the network; and
  sum the estimated consumption index to compute an estimated cumulative bandwidth utilization for the new VM over all the links in the paths that would connect the new VM to each of one or more peer VMs.

56. The network element of claim 55 wherein the controller is further configured to:
  compare the estimated cumulative bandwidth utilization to a predefined threshold value; and
  identify the selected candidate VM site pairs to receive the selected VM pair based on the comparison.

* * * * *

UNITED STATES PATENT AND TRADEMARK OFFICE
CERTIFICATE OF CORRECTION

| | | |
|---|---|---|
| PATENT NO. | : 8,862,744 B2 | Page 1 of 1 |
| APPLICATION NO. | : 13/396309 | |
| DATED | : October 14, 2014 | |
| INVENTOR(S) | : Garg et al. | |

It is certified that error appears in the above-identified patent and that said Letters Patent is hereby corrected as shown below:

In the Specification

In Column 13, Line 23, delete "interfaces 212," and insert -- interfaces 214, --, therefor.

In Column 13, Lines 23-24, delete "Interface 214, and a memory 216." and insert -- Interface 216, and a memory 212. --, therefor.

Signed and Sealed this
Twenty-sixth Day of May, 2015

Michelle K. Lee
*Director of the United States Patent and Trademark Office*